(12) United States Patent
Qi et al.

(10) Patent No.: US 12,267,024 B2
(45) Date of Patent: Apr. 1, 2025

(54) AC-TO-DC AND DC-TO-AC POWER CONVERSION

(71) Applicant: VERSITECH LIMITED, Hong Kong (CN)

(72) Inventors: Wenlong Qi, Hong Kong (CN); Sinan Li, Hong Kong (CN); Siew Chong Tan, Hong Kong (CN); Shu Yuen Hui, Hong Kong (CN)

(73) Assignee: VERSITECH LIMITED, Hong Kong (CN)

( * ) Notice: Subject to any disclaimer, the term of this patent is extended or adjusted under 35 U.S.C. 154(b) by 354 days.

(21) Appl. No.: 17/434,463

(22) PCT Filed: Mar. 10, 2020

(86) PCT No.: PCT/CN2020/078537
§ 371 (c)(1),
(2) Date: Aug. 27, 2021

(87) PCT Pub. No.: WO2020/182114
PCT Pub. Date: Sep. 17, 2020

(65) Prior Publication Data
US 2022/0140751 A1    May 5, 2022

Related U.S. Application Data

(60) Provisional application No. 62/816,483, filed on Mar. 11, 2019.

(51) Int. Cl.
*H02M 7/797*    (2006.01)
(52) U.S. Cl.
CPC .................. *H02M 7/797* (2013.01)
(58) Field of Classification Search
CPC ...... H02M 7/979; H02M 7/81; H02M 7/4837; H02M 7/487; H02M 3/07; H02M 3/071;
(Continued)

(56) References Cited

U.S. PATENT DOCUMENTS

| 2012/0153912 A1* | 6/2012 | Demski | H02M 3/07 |
| | | | 323/282 |
| 2014/0266135 A1* | 9/2014 | Zhak | H02M 3/07 |
| | | | 323/311 |

(Continued)

FOREIGN PATENT DOCUMENTS

| CN | 101772882 A | 7/2010 |
| CN | 102158071 A | 8/2011 |

(Continued)

OTHER PUBLICATIONS

International Search Report for related International Application No. PCT/CN2020/078537, dated May 26, 2020.

(Continued)

*Primary Examiner* — Nguyen Tran
(74) *Attorney, Agent, or Firm* — Leydig, Voit & Mayer, Ltd.

(57) ABSTRACT

A power converter circuit includes: a direct current (DC) side; a first passive network; a first current switching network; at least one floating capacitor; a second current switching network; a second passive network; and an alternating current (AC) side. The first passive network is connected between the DC side and the first current switching network for linking the DC side and the first current switching network. The first current switching network comprises at least four serially linked switches for switching the power converter circuit between switching cycles. The at least one floating capacitor is connected to the first current switching network. The second current switching network comprises two pairs of switches for providing an interface between the first current switching network and the second passive network. The second passive network is connected between the second current switching network and the AC side.

17 Claims, 21 Drawing Sheets

(58) Field of Classification Search
CPC ... H02M 1/0093; H02M 1/0095; H02M 1/322
See application file for complete search history.

(56) References Cited

U.S. PATENT DOCUMENTS

| | | | |
|---|---|---|---|
| 2015/0288284 A1 | 10/2015 | Lavieville | |
| 2015/0311822 A1 | 10/2015 | Ma et al. | |
| 2017/0155321 A1* | 6/2017 | Kidera | H02M 7/4837 |
| 2017/0237339 A1* | 8/2017 | Young | H02M 1/38 |
| | | | 363/126 |
| 2021/0367532 A1* | 11/2021 | Kidera | H02M 7/4837 |

FOREIGN PATENT DOCUMENTS

| | | | |
|---|---|---|---|
| CN | 102158072 A | 8/2011 | |
| CN | 102185491 A | 9/2011 | |
| CN | 102355152 A | 2/2012 | |
| CN | 102969880 A | 3/2013 | |
| CN | 103904905 A | 7/2014 | |
| CN | 103944365 B | 7/2014 | |
| JP | 5279381 B2 | 5/2013 | |

OTHER PUBLICATIONS

Watanabe, H., et al., "Development of DC to Single-Phase AC Voltage Source Inverter with Active Power Decoupling Based on Flying-Capacitor DC/DC Converter", *IEEE Trans Power Electron.*, vol. 33, No. 6, pp. 4992-5004 (Jun. 2018).

Ohnuma, Y., et al., "A Novel Single-Phase Buck PFC AC-DC Converter with Power Decoupling Capability Using An Active Buffer", *IEEE Trans Industry Application*, vol. 50, No. 3, 1905-1914 (May 2014).

Ohnuma, Y., et al., "A Single-Phase Current-Source PV Inverter with Power Decoupling Capability Using An Active Buffer", *IEEE Trans Industry Application*, vol. 51, No. I, pp. 531-538 (Jan. 2015).

Qi, W., et al., "A Single-Phase Three-Level Flying Capacitor PFC Rectifier without Electrolytic Capacitors", *IEEE Trans. Power Electron*, (2018).

Qi, W., et al., "A Novel Active Power Decoupling Single-Phase PWM Rectifier Topology", *Conference Proceedings, IEEE Applied Power Electronic Conference and Exposition, APEC*, pp. 89-95 *2014).

Li, S., et al. "Integration of An Active Filter and a Single-Phase AC/DS Converter with Reduced Capacitance Requirement and Component Count", *IEEE Trans. Power Electron*, vol. 31, No. 6, pp. 4121-4137 (Jun. 2016).

* cited by examiner

AC-TO-DC AND DC-TO-AC POWER CONVERSION

CROSS-REFERENCE TO RELATED APPLICATIONS

This patent application is a national stage filing of International Application No. PCT/CN2020/078537, filed on Mar. 10, 2020, which itself claims the benefit of U.S. Provisional Patent Application No. 62/816,483, filed Mar. 11, 2019, each of which are incorporated by reference.

FIELD

Embodiments of the present application relate to power converters, including single-phase alternating current (AC)-to-direct current (DC) power converters and DC-to-AC power converters.

BACKGROUND

Single-phase power converters with simultaneous high power-density, high conversion efficiency and high reliability ($H^3$) are desirable in many emerging applications such as driving light-emitting diodes (LEDs), quick charging for mobile phones, and photovoltaic (PV) inverters. Single-phase converters utilize an energy storage capacity to buffer the double-line-frequency power imbalance between the AC side and the DC side. Conventionally, bulky electrolytic capacitor(s) (E-cap(s)) are connected to the DC side of a single-phase converter as a passive pulsating power buffer (PPB). For example, as depicted in FIG. 1, a prior art converter 100 is provided with a capacitor $C_b$ 102 attached to a DC-link 104 (also referred to herein as a DC source or load) of an H-bridge inverter 106 (a commonly used single-phase power inverter circuit), which in turn is connected to an inductor $L_{ac}$ 108 and an AC voltage $V_{ac}$ 110. Here, a volume of $C_b$ is generally large because of a large energy storage requirement for $C_b$ 102 due to a stringent DC-link voltage ripple requirement. The use of large E-caps leads to two issues: (i) a lower power density due to their bulky volume; and (ii) lower reliability due to the typical service lifetime of an E-cap being <7,000 hours at 105° C., which is much shorter than that of an LED or a PV panel.

Utilizing active pulsating-power-buffering (PPB) may substantially reduce the energy storage requirement in a single-phase converter. The basic idea of active PPB is to decouple the PPB capacitor $C_b$ 102 from the DC-link 104 and to allow a large voltage fluctuation (i.e., $\Delta v_c$) across it. As the power of $C_b$ 102 is proportional to $\Delta v_c$, a small $C_b$ 102 with a small form factor can be utilized to buffer the ripple power given a large $\Delta v_c$. Moreover, non-electrolytic capacitors such as film or laminated ceramic capacitors, which are more reliable and compact, can be utilized for $C_b$ 102 due to a reduction of an energy storage requirement.

Despite many power conversion solutions with active PPB having been developed, such existing solutions have key limitations, including: (i) high voltage stress of semiconductor switches, and (ii) infeasibility of outputting a low DC voltage (in the case of AC-to-DC applications) or generating power from a low DC voltage source (in the case of DC-to-AC applications) in a single power-conversion stage. These existing solutions generally produce more power losses (which lowers power conversion efficiency), require the use of expensive semiconductor switches (which increases cost), and have very limited areas of applications.

SUMMARY

In an exemplary embodiment, the present application provides a power converter circuit. The power converter circuit includes: a direct current (DC) source or load; a first passive network; a first current switching network; at least one floating capacitor; a second current switching network; a second passive network; and an alternating current (AC) source or load. The first passive network is connected between the DC source or load and the first current switching network for linking the DC source or load and the first current switching network.

In another exemplary embodiment, the present application provides a method for operating a power converter circuit. The method includes: during a first interval, a first passive network provides an interface between a direct current (DC) source or load and a rectified converter-side voltage of a second passive network; during a second interval, the first passive network is connected solely to the DC source or load; during a third interval, the first passive network provides an interface between at least one floating capacitor and the DC source or load; and during a fourth interval, the first passive network provides an interface between the at least one floating capacitor, the DC source or load, and the rectified converter-side voltage of the second passive network.

In yet another exemplary embodiment, the present application provides a power converter circuit. The power converter circuit includes: a direct current (DC) source or load; a first passive network; a first current switching network; at least one floating capacitor; a second current switching network; a second passive network; and an alternating current (AC) source or load. The first passive network is connected between the DC source or load and the first current switching network for linking the DC source or load and the first current switching network. The first current switching network comprises at least four serially linked switches for switching the power converter circuit between switching cycles. The at least one floating capacitor is connected to the first current switching network. The second current switching network comprises two pairs of switches for providing an interface between the first current switching network and the second passive network, and the second passive network is connected between the second current switching network and the AC source or load

DETAILED DESCRIPTION

Exemplary embodiments of the application provide single-phase converter circuit configurations and methods for utilizing active PPB that allows for (i) a more compact design of the DC-link capacitor 102 and (ii) the use of non-electrolytic capacitors such as film or laminated ceramic capacitors that are more reliable than E-caps. Advantages achieved by exemplary embodiments include: (1) reduced volume of a PPB capacitor $C_b$ due to the utilization of active PPB; (2) sinusoidal AC current clue to the controllability of the input current throughout an AC line period; (3) reduced voltage and current stress of all switching devices; (4) reduced volume of an inductor L due to a reduced peak inductor current; and (5) a DC-link voltage $v_{dc}$ can be lower than peak AC voltage $V_{ac}$.

Figure 1:
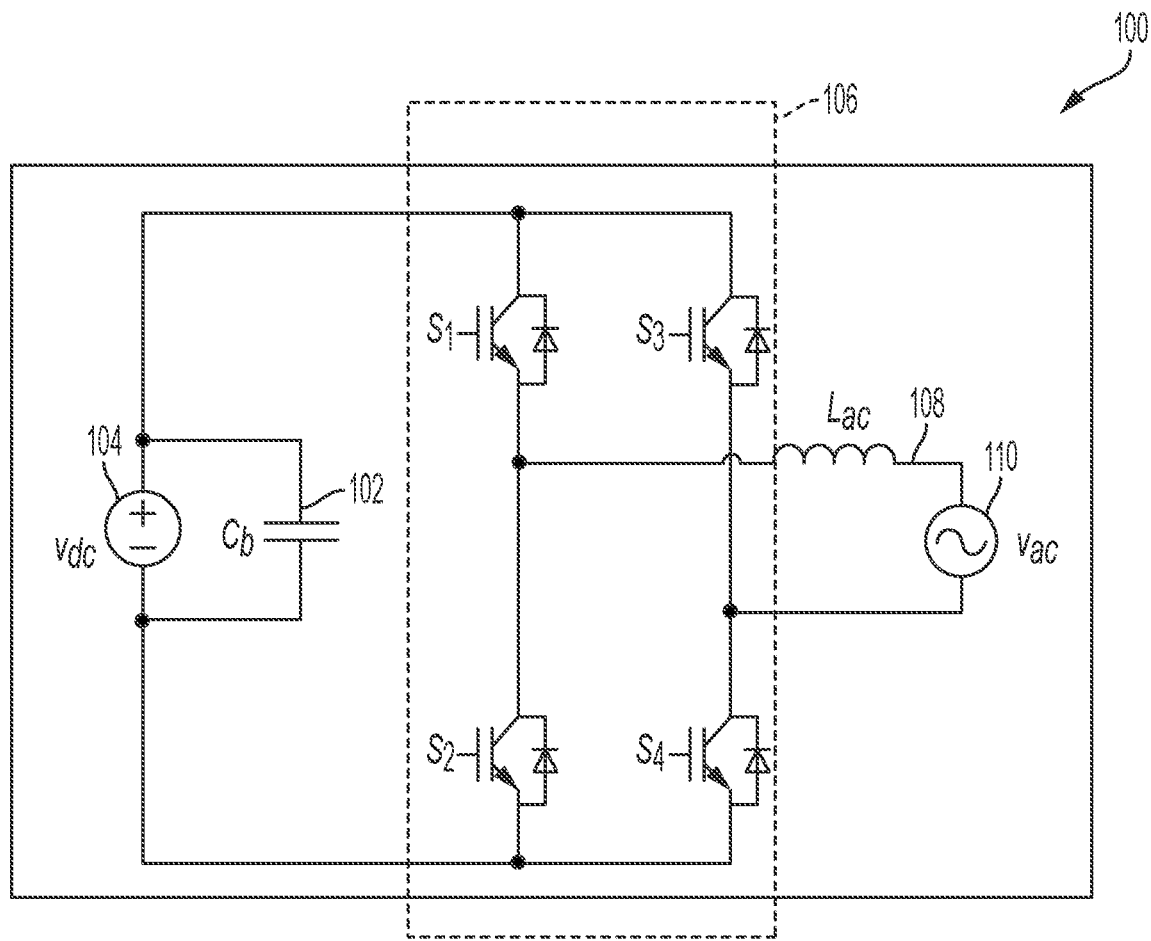
FIG. 1 depicts a prior art power converter circuit.
Figure 2:
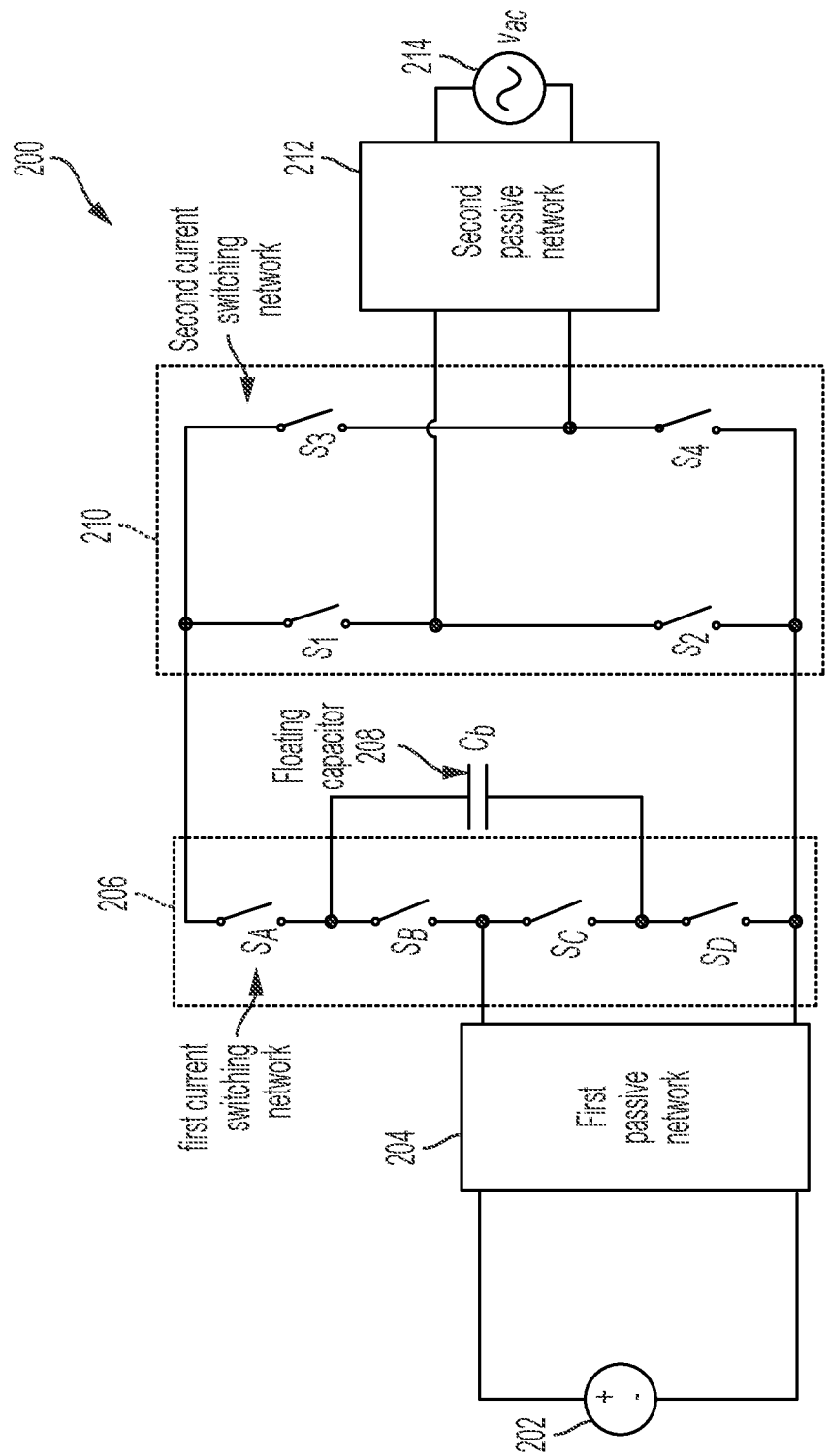
FIG. 2 depicts an example of a power converter circuit in accordance with exemplary embodiments of the present application.

FIG. 2 depicts an example of a power converter circuit 200 in accordance with exemplary embodiments of the present application. The power converter circuit 200 of FIG. 2 includes a DC voltage source or load 202, a first passive network 204, a first current switching network 206, a floating capacitor 208, a second current switching network 210, a second passive network 212 and an AC voltage source or load 214. The power converter circuit 200 is a single-phase converter circuit including: (a) the first passive network 204 is connected between a DC-link, such as the DC voltage source or load 202, and the first current switching network 206 in order to link the DC voltage source or load 202 and the first current switching network 206; (b) the first current switching network 206 includes four serially linked switches $S_A$, $S_B$, $S_C$ and $S_D$ for switching the converter circuit 200 between discrete successive switching cycles with at least one switch being a voltage-bidirectional current switch; (c) a floating capacitor 208 (or floating capacitors) with its (or their) terminals connected with the first current switching network 206; (d) the second current switching 210 network comprising two pairs of switches $S_1$, $S_2$ and $S_3$, $S_4$ for providing an interface between the first switching network 206 with the second passive network 212; and (e) the second passive network 212 for providing an interface between the second current switching network 210 and the AC side 214 of the converter 200.

In certain embodiments, the first passive network 204 may include one inductor or one inductor-capacitor network, and the second passive network 212 may include one capacitor or a serially linked capacitor-inductor network with the capacitor directly providing an interface between the second current switching network 210 and the AC side 214 of the converter 200.

In certain embodiments, a voltage-bidirectional current switch in the first current switching network 206 may be implemented using a controlled switch and an uncontrolled switch arranged in a back-to-back configuration for unidirectional power conversion applications (such as an ac/dc rectifier (see FIG. 6) and a dc/ac inverter (see FIGS. 17 and 18)), and may be implemented using a pair of serially linked controlled switches arranged in a back-to-back configuration for bidirectional power conversion applications. The switches $S_1$, $S_2$, $S_3$ and $S_4$ in the second current switching network 210 may be implemented using uncontrolled switches for ac/dc rectifier applications, and may be implemented using controlled switches for dc/ac inverter applications and/or bidirectional power conversion applications. The floating capacitor 208 may be implemented using one single capacitor and/or a stack of capacitor banks. Additionally, the DC-link voltage of the DC voltage source or load 202 of the converter 200 may contain some voltage variations around a DC offset voltage.

Figure 3:
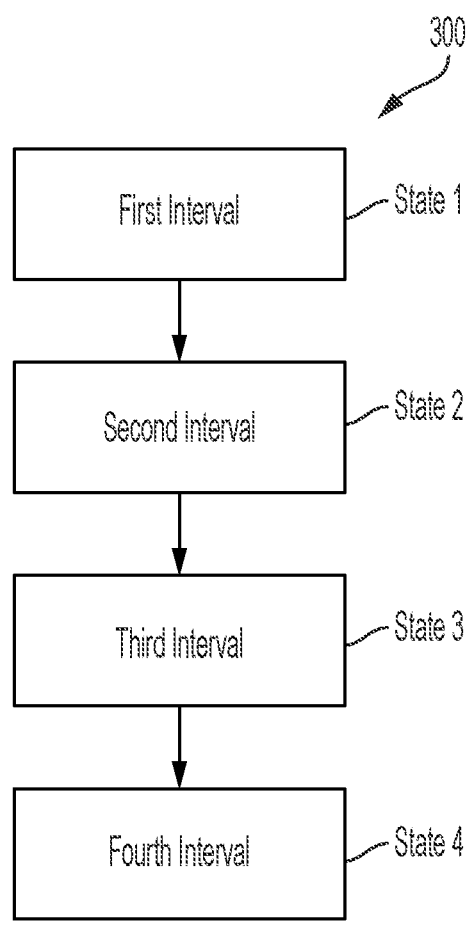
FIG. 3 depicts a method of operating a power converter in accordance with exemplary embodiments of the present application.

In reference to the converter 200, FIG. 3 provides a switching cycle method 300 for operating a single-phase converter circuit including four operating states. An exemplary switching cycle includes: a first interval during which the first passive network 204 is providing the interface between the DC voltage source or load 202 and the rectified converter-side voltage (voltage across the second current switching network 210 measured from a common node between $S_1$, and $S_3$ to a common node of $S_2$ and $S_4$) of the second passive network 212 (State 1); a second interval during which the first passive network 204 is connected solely to the DC voltage source or load 202 (State 2); a third interval during which the first passive network 204 is providing an interface between the floating capacitor 208 (or floating capacitors) and the DC voltage source or load 202 (State 3); and a fourth interval during which the first passive network 204 is providing an interface between the floating capacitor 208 (or floating capacitors), the DC voltage source or load 202, and the rectified converter-side voltage (voltage across the second current switching network 210 measured from a common node between $S_1$, and $S_3$ to a common node of $S_2$ and $S_4$) of the second passive network 212 (State 4). In certain embodiments, the switching cycle of method 300 may further include a cut-off interval during which the current of an inductor of the first passive network 204 becomes zero.

Figure 4:
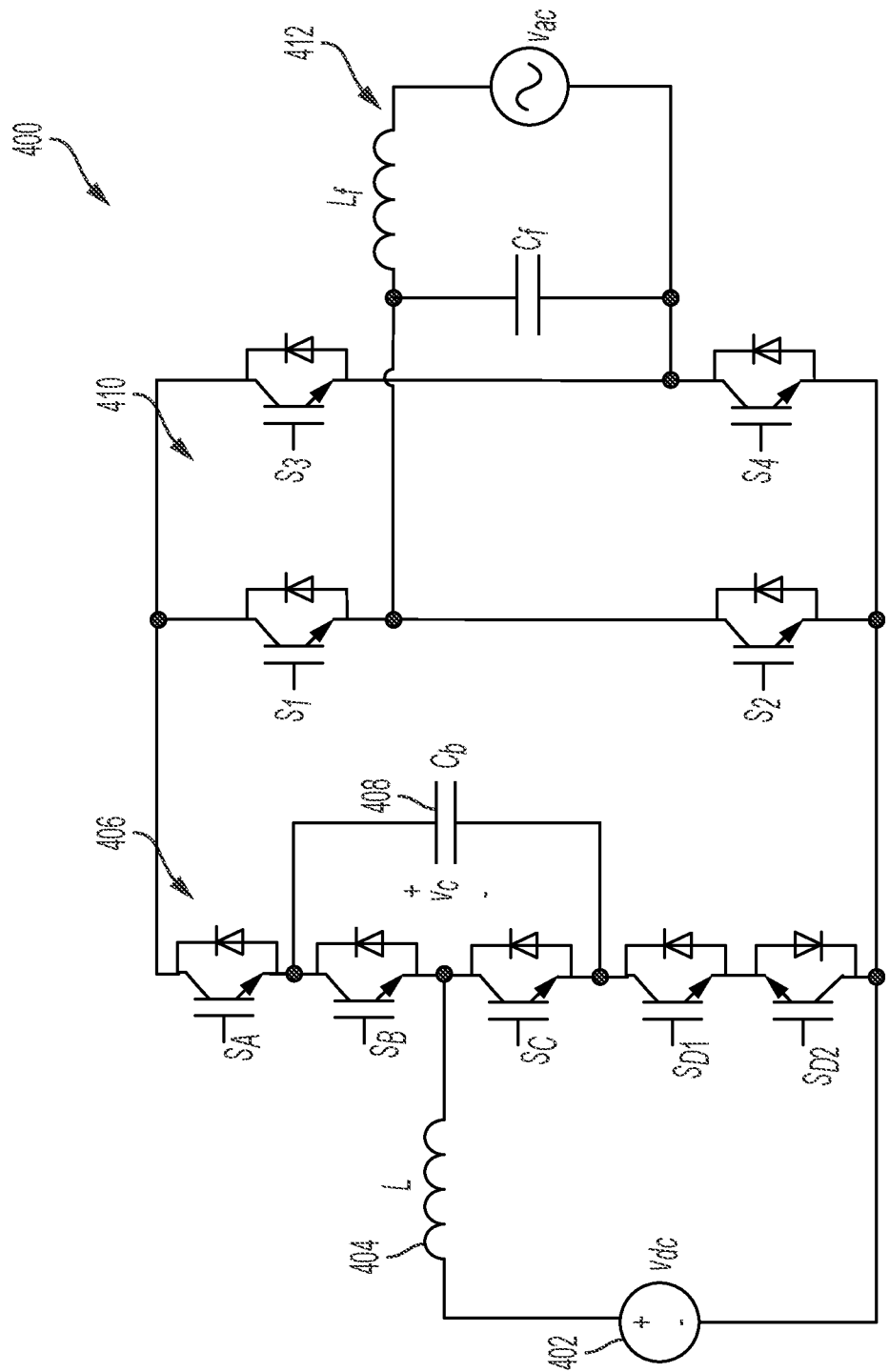
FIG. 4 depicts an example of a power converter circuit in accordance with exemplary embodiments of the present application.
Figure 5:
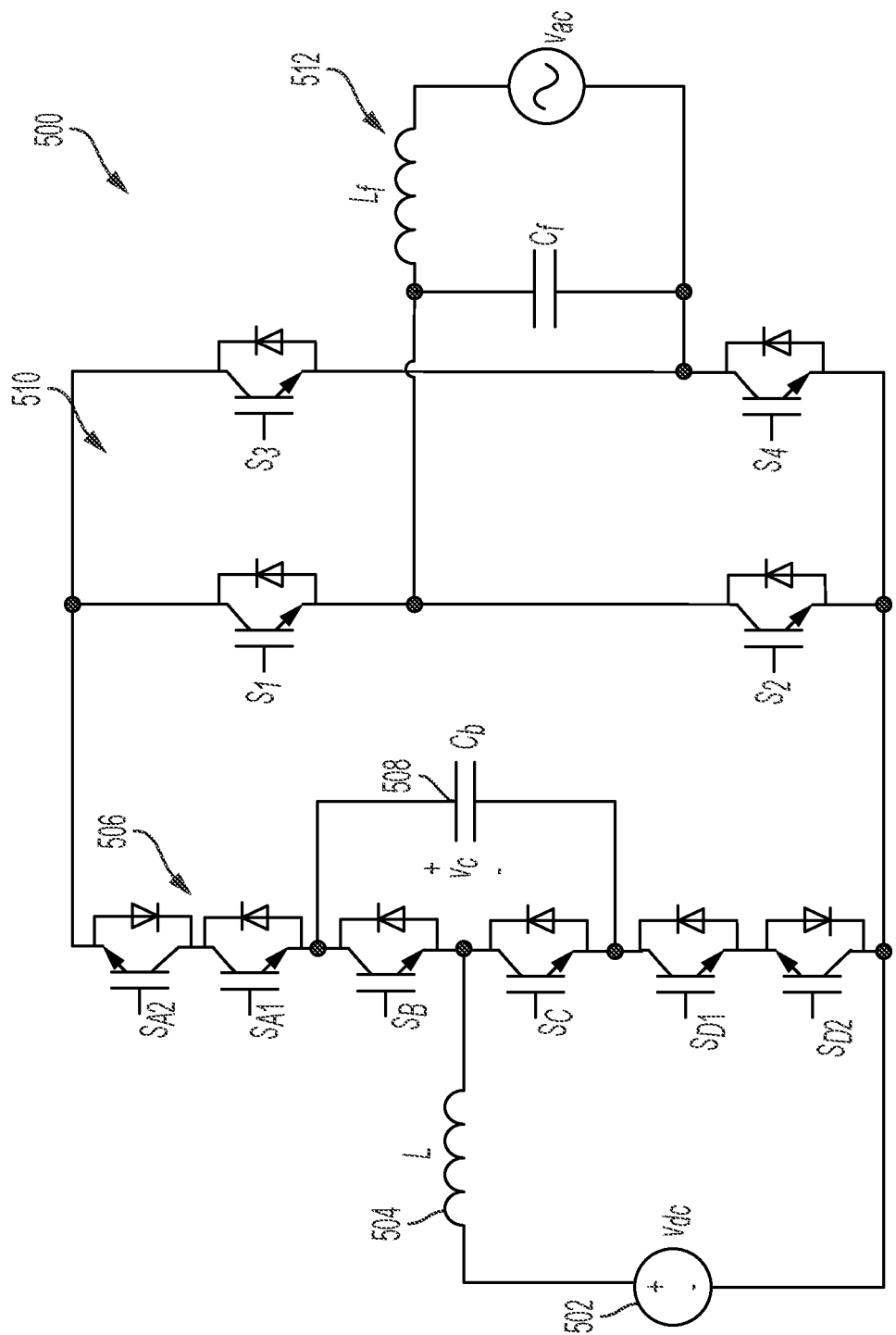
FIG. 5 depicts an example of a power converter circuit in accordance with exemplary embodiments of the present application.

FIGS. 4 and 5 depict particular embodiments of the power converter 200 of FIG. 2 implemented as bidirectional power converters capable of both AC to DC conversion and DC to AC conversion.

In the embodiment of FIG. 4, a converter 400 is provided where: (i) a first passive network 404 is formed by a single inductor L; (ii) a first current switching network 406 is formed by $S_A$-$S_D$ (where $S_A$, $S_B$, and $S_C$ are controlled switches, and $S_D$ is a voltage-bidirectional switch formed by two controlled switches $S_{D1}$ and $S_{D2}$ arranged in a back-to-back configuration), a floating capacitor ($C_b$) 408 shunt across the common nodes between $S_A$ and $S_B$ and between $S_C$ and $S_{D1}$; (iii) a second switching network 410 is formed by four high-frequency and fully controlled switches $S_1$-$S_4$ arranged in an H-bridge configuration; and (iv) a second passive network 412 is formed by an inductor-capacitor network $L_f$-$C_f$.

Similar to the converter 200, the switching cycle method 300 (see FIG. 3) provides for operating the converter 400 in four operating states. This switching cycle includes: a first interval during which the first passive network 404 is providing the interface between the DC voltage source or load 402 and the rectified converter-side voltage (voltage across the second current switching network 210 measured from a common node between $S_1$, and $S_3$ to a common node of $S_2$ and $S_4$) of the second passive network 412 (State 1); a second interval during which the first passive network 404 is connected solely to the DC voltage source or load 402 (State 2); a third interval during which the first passive network 404 is providing an interface between the floating capacitor 408 (or floating capacitors) and the DC voltage source or load 402 (State 3); and a fourth interval during which the first passive network 404 is providing an interface between the floating capacitor 408 (or floating capacitors), the DC voltage source or load 402, and the rectified converter-side voltage of the second passive network 412 (State 4). In a further embodiment, this switching cycle may further include a cut-off interval during which a current of an inductor L of the first passive network 404 becomes zero.

In the embodiment of FIG. 5, a converter 500 is provided where: (i) a first passive network 504 is formed by a single inductor L; (ii) a first current switching network 506 is formed by $S_A$-$S_D$ (where $S_B$ and $S_C$ are controlled switches, and $S_A$ and $S_D$ are a voltage-bidirectional switches formed by two controlled switches ($S_{A1}$ and $S_{A2}$, and $S_{D1}$ and $S_{D2}$) and arranged in a back-to-back configuration respectively), a floating capacitor ($C_b$) 508 shunt across the common nodes between $S_{A1}$ and $S_B$ and between $S_C$ and $S_{D1}$; (iii) a second switching network 510 is formed by four line-frequency and fully controlled switches $S_1$-$S_4$ arranged in an H-bridge configuration; and (iv) a second passive network 512 formed by an inductor-capacitor network $L_f$-$C_f$.

Similar to the converter 200, the switching cycle method 300 (see FIG. 3) provides for operating the converter 500 in four operating states. This switching cycle includes: a first interval during which the first passive network 504 is providing the interface between the DC voltage source or load 502 and the rectified converter-side voltage (voltage across the second current switching network 210 measured from a common node between $S_1$, and $S_3$ to a common node of $S_2$ and $S_4$) of the second passive network 512 (State 1); a second interval during which the first passive network 504 is connected solely to the DC voltage source or load 502 (State 2); a third interval during which the first passive network 504 is providing an interface between the floating capacitor 508 (or floating capacitors) and the DC voltage source or load 502 (State 3); and a fourth interval during which the first passive network 504 is providing an interface between the floating capacitor 508 (or floating capacitors), the DC voltage source or load 502, and the rectified converter-side voltage of the second passive network 512 (State 4). In a further embodiment, this switching cycle may further include a cut-off interval during which a current of an inductor L of the first passive network 504 becomes zero.

A difference between the converters 400 and 500 in FIG. 4 and FIG. 5 is the construction of switch $S_A$ of FIG. 2. In FIG. 4, $S_A$ is constructed by a fully controlled switch $S_A$ (e.g. an insulated-gate bipolar transistor (IGBT) switch), while in FIG. 5, $S_A$ is constructed by two fully controlled switches $S_{A1}$ and $S_{A2}$ (e.g. both IGBT switches) connected in a back-to-back configuration. As a result of this back-to-back configuration of $S_A$, the active switches $S_1$ to $S_4$ in FIG. 5 can be turned ON/OFF at line frequency with relatively lower switching losses. In FIGS. 4, S1 to S4 involve high-frequency operation, leading to relatively higher switching losses, but it will be appreciated that due to one less active switch being used, the FIG. 4 configuration has reduced complexity and cost and may reduce conduction losses.

Figure 6:
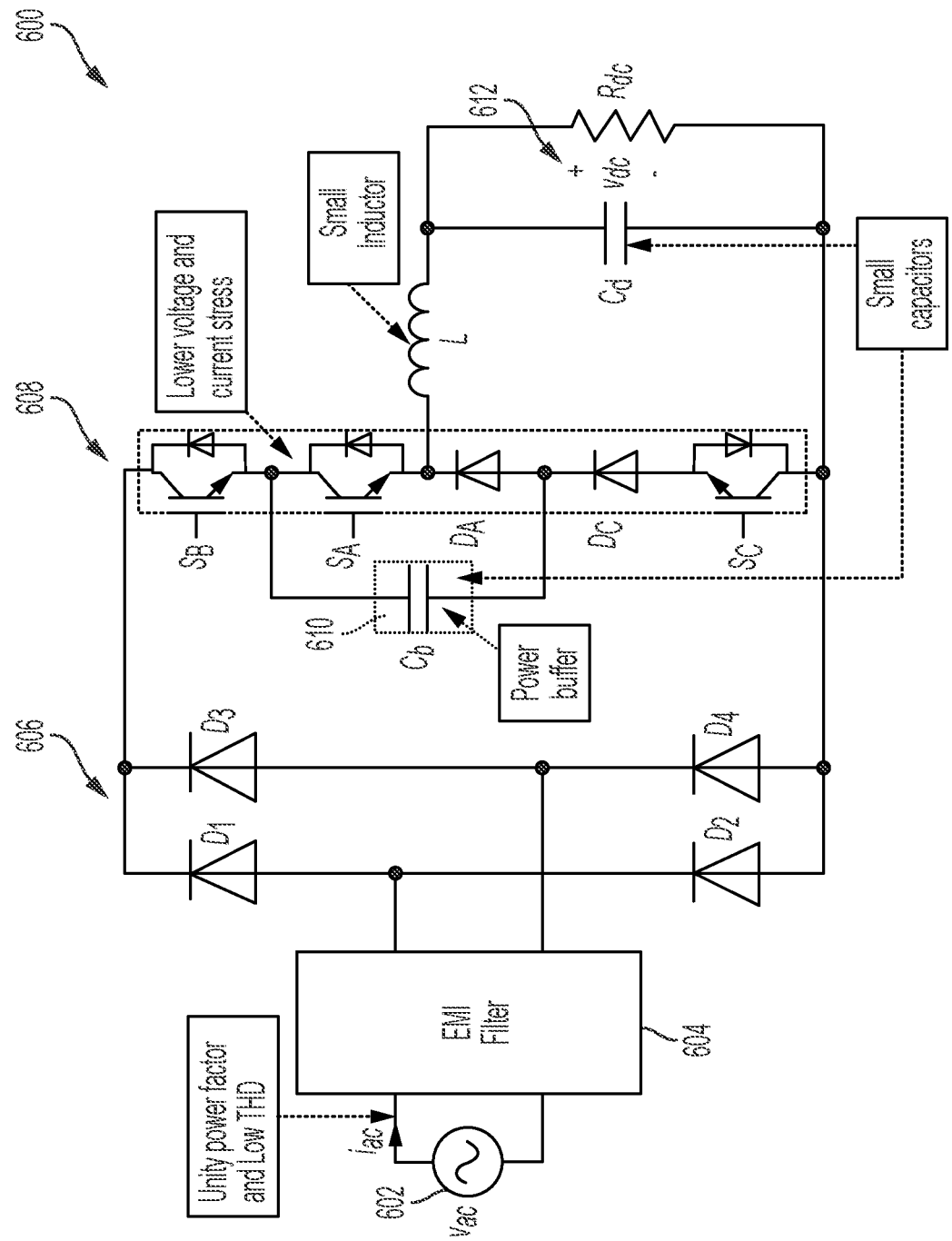
FIG. 6 depicts an example of a power converter circuit in accordance with exemplary embodiments of the present application.

FIG. 6 illustrates a power converter 600 similar to the power converter 200 of FIG. 2 but implemented as a unidirectional power converter for AC to DC power conversion. The converter 600 is specifically arranged as a single-phase three-level flying-capacitor buck power factor correction (PFC) rectifier 600 used as an example to illustrate operating principles of an exemplary embodiment of the present application. The rectifier 600 includes: (i) an AC input voltage supply ($v_{ac}$) 602; (ii) a first passive network formed by an Electro-Magnetic Interference (EMI) Filter 604; (iii) a front-end diode bridge 606 formed by four diodes $D_1$-$D_4$ arranged in a bridge rectifier configuration; (iv) a current switching network 608 formed by $S_A$-$S_C$, $D_A$ and $D_C$ (where $S_A$ and $S_B$ are controlled switches, $D_A$ is a diode, and a voltage-bidirectional switch is formed by a diode $D_C$ and a controlled switch $S_C$ arranged in a back-to-back configuration); (v) a floating capacitor $C_b$ 610 shunt across the common nodes between $S_A$ and $S_B$ and between $D_A$ and $D_C$; and (vi) a second passive network 212 formed by an inductor-capacitor-resistor network L-$C_{dc}$-$R_{dc}$.

Figure 7A:
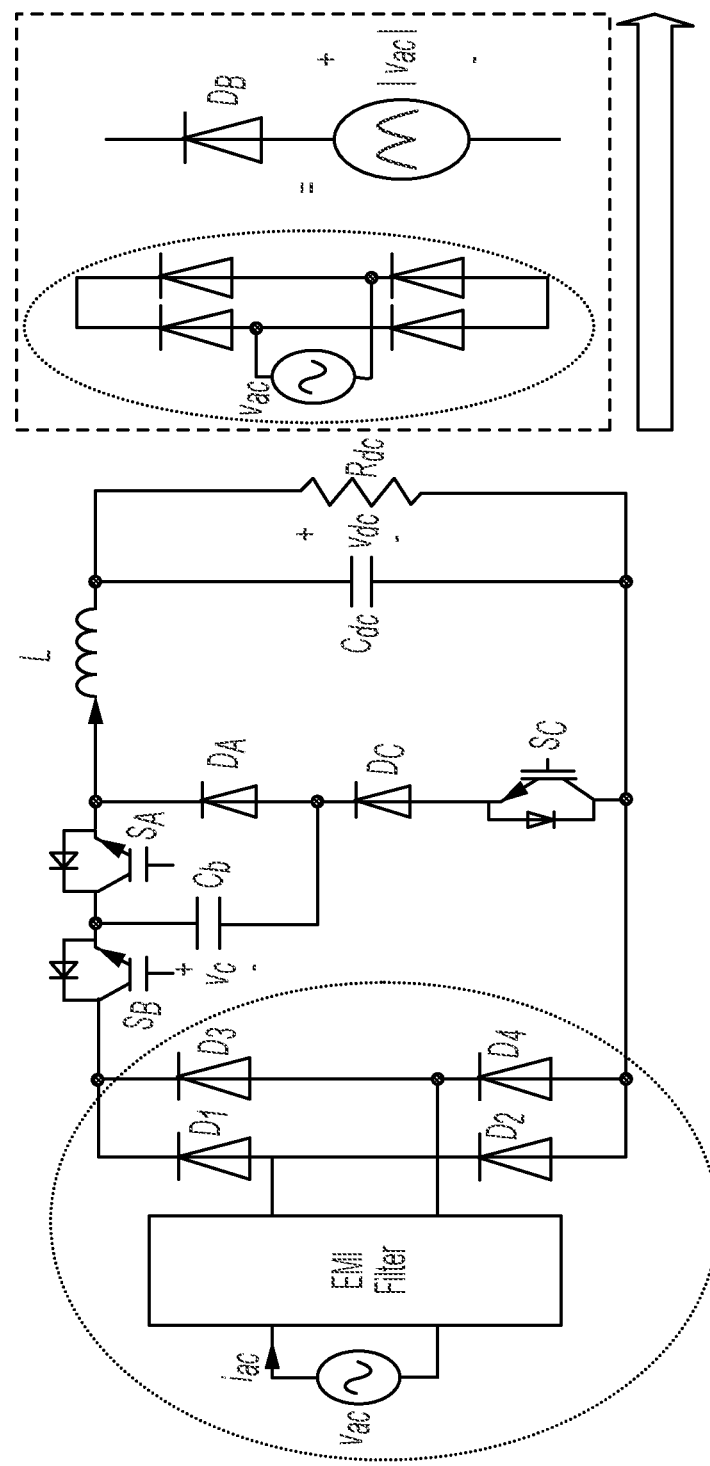
FIGS. 7a and 7b depict a simplification technique for analyzing the power converter circuit of FIG. 6.
Figure 7B:
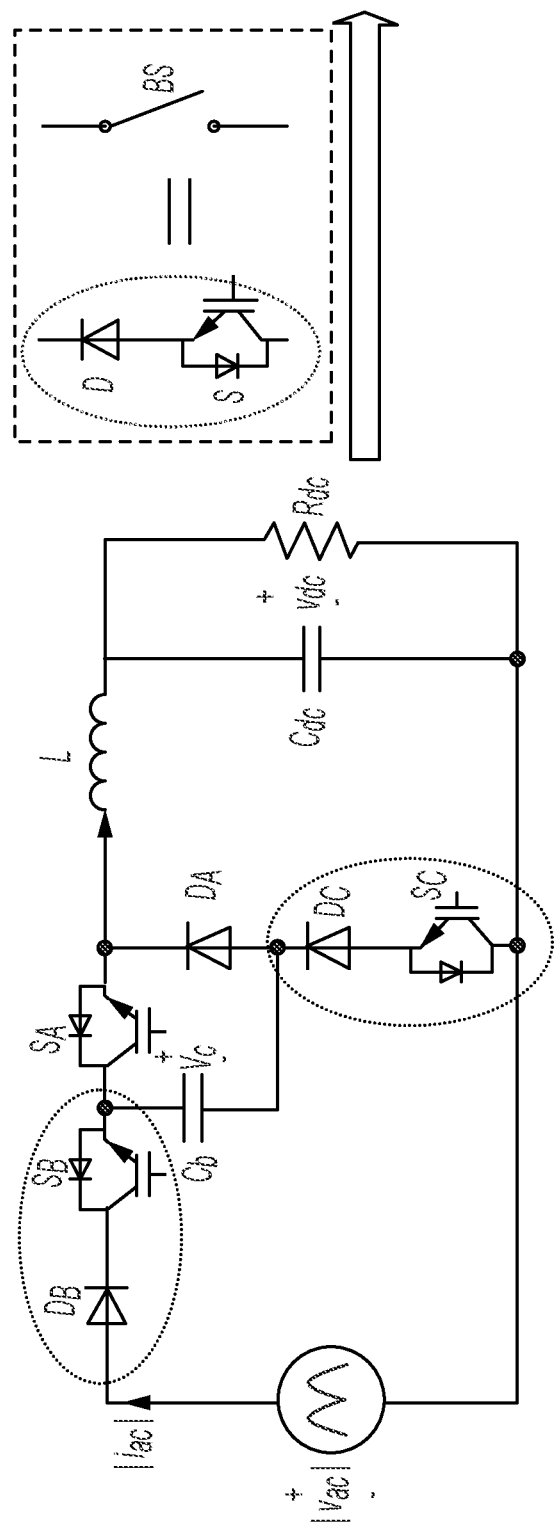
Figure 8:
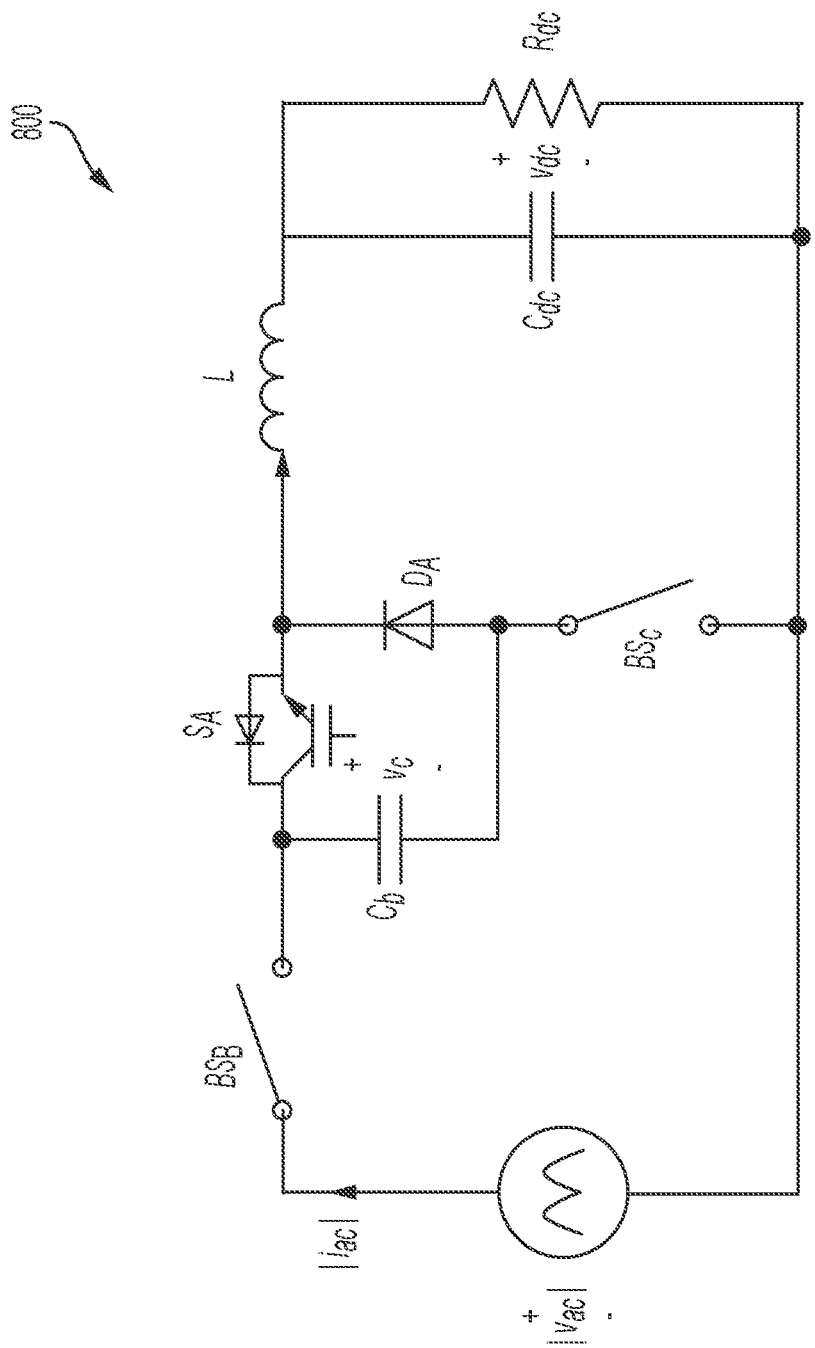
FIG. 8 depicts a simplified circuit for analysis of the power converter circuit of FIG. 6 in accordance with exemplary embodiments of the present application.

To illustrate operating principles of rectifier 600 in a simplified format, a two-step simplification procedure may be performed to obtain a simplified circuit for analysis. In the first step, neglect the EMI filter 602 and represent the line voltage $v_{ac}$ and the front-end diode bridge rectifier 606 by a rectified sinusoidal voltage source $|v_{ac}|$ that is in series with a diode $D_B$, as shown in FIG. 7a. In the second step, replace any series connections of an MOSFET (S) and a diode (D) using a bi-quadrant switch (BS) that can only conduct a positive current whilst blocking voltage bi-directionally, as shown in FIG. 7b. Performing these two steps results in an equivalent circuit 800 illustrated in FIG. 8.

Figure 9:
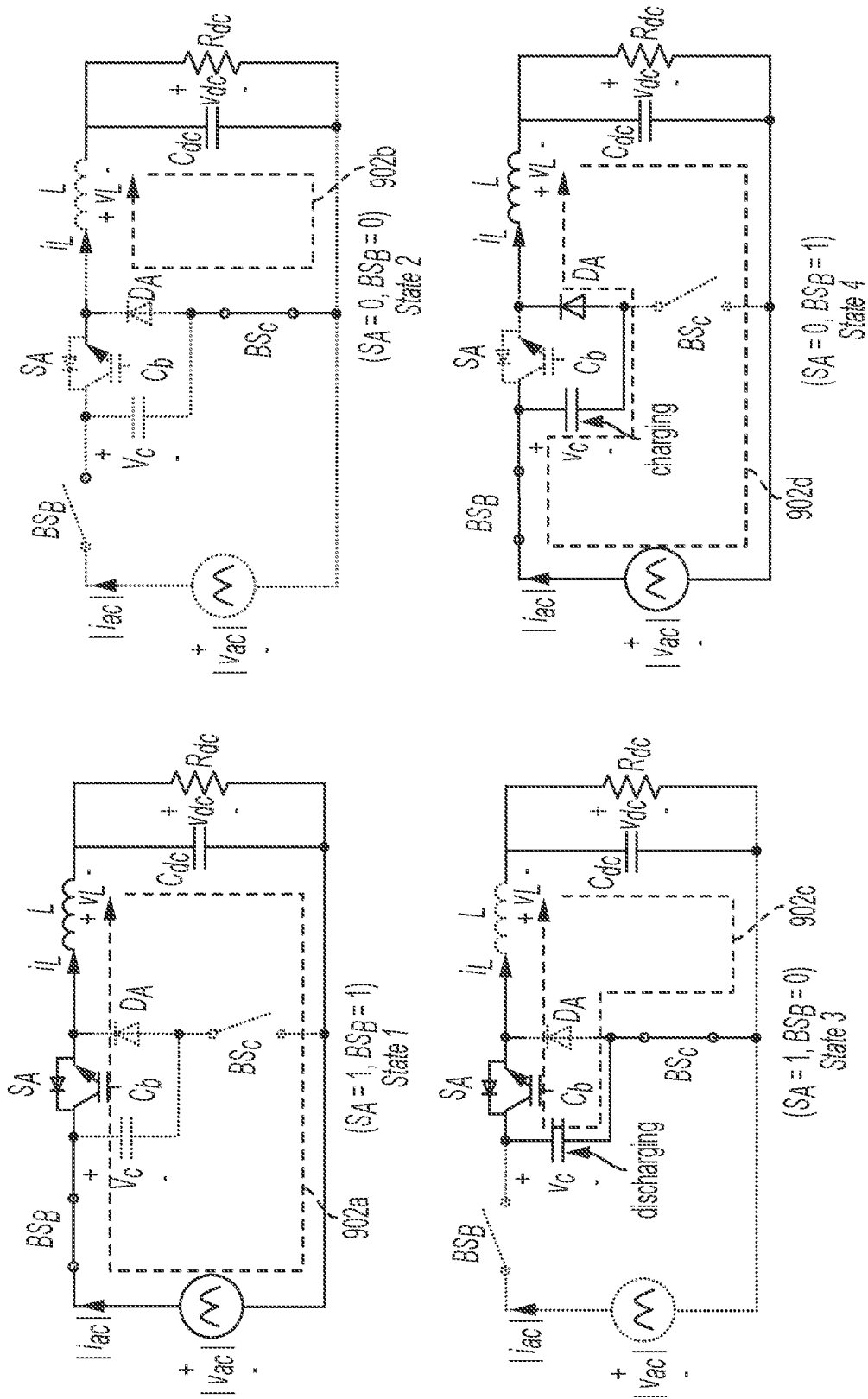
FIG. 9 depicts operating states of the simplified circuit depicted in FIG. 8 in accordance with exemplary embodiments of the present application.

In the equivalent circuit 800, the bi-quadrant switches $BS_B$ and $BS_C$ are switched complementarily. Assuming a continuous-conduction-mode (CCM) of operation, the equivalent circuit 800 has four switching states as depicted in FIG. 9, with a power flow path 902 being altered based on the switching state. In State 1 and State 2, the inductor L is energized by $|v_{ac}|$ (power flow path 902a) and de-energized to the $C_{dc}$-$R_{dc}$ load (power flow path 902b), respectively, while $C_b$ 610 (see FIG. 6) is not involved in circuit operation or in the power flow path 902a and 902b. In State 3 and State 4, $C_b$ is part of the power flow path 902c and 902d. Specifically, $C_b$ 610 is discharged by a current equivalent to the inductor L current $i_L$ in State 3 (power flow path 902c) and charged by a current equivalent to $i_L$ in State 4 (power flow path 902d). Thus, an extra capacitor charging state and a discharging state are created.

Further, by controlling a duration of State 3 and State 4, an amount of power flowing into/out of $C_b$ 610 can be actively controlled, thereby achieving active PPB. Furthermore, a line current $|i_{ac}|$ is always controllable irrespective of a line voltage level. This is because $|i_{ac}|$ equals to $i_L$ whenever $BS_B=1$ (State 1 and State 4), while it equals to 0 when $BS_B=0$ (State 2 and State 3). In contrast, $|i_{ac}|$ cannot be controlled when $|v_{ac}|<V_{dc}$ in the conventional buck PFC rectifier.

Moreover, an additional feature is that voltage ratings of $S_A$ and $D_A$ are always clamped by $v_c$ which can be designed at a low voltage level, while those of $S_B$, $S_C$, and $D_C$ are also de-rated due to the series insertion of $C_b$ 610 in the power flow path 902c and 902d.

A summary of the switching states is tabulated below in Table I:

TABLE I

Summary of Switching States.

| Operating State | $S_A$ | $BS_B$ | $C_b$ | $v_L$ |
|---|---|---|---|---|
| State 1 | 1 | 1 | Idle | $|v_{ac}| - v_{dc}$ |
| State 2 | 0 | 0 | Idle | $-v_{dc}$ |
| State 3 | 1 | 0 | Discharge | $v_c - v_{dc}$ |
| State 4 | 0 | 1 | Charge | $|v_{ac}| - v_c - v_{dc}$ |

Below, a steady-state circuit analysis of the rectifier 600 of FIG. 6 is provided. Assuming a unity power factor and that $v_{ac}$ and $i_{ac}$ are pure sinusoidal waveforms, as shown below as:

$$\begin{cases} v_{ac} = V_{ac} \sin \omega t \\ i_{ac} = I_{ac} \sin \omega t \end{cases} \quad (1)$$

where $V_{ac}$ and $I_{ac}$ are the amplitudes of $v_{ac}$ and $i_{ac}$, respectively, and ω is the line frequency, then, the instantaneous input power $p_{ac}$ is $$p_{ac} = v_{ac}i_{ac} = \underbrace{\frac{V_{ac}I_{ac}}{2}}_{P_{dc}} - \underbrace{\frac{V_{ac}I_{ac}}{2}\cos(2\omega t)}_{p_r}. \quad (2)$$

$p_{ac}$ thus contains a double-line-frequency pulsating power $p_r$ and a constant DC power $P_{dc}$. Assuming that $p_r$ is fully buffered by $C_b$, the voltage and current of $C_b$ can be further calculated as:

$$v_c = \sqrt{\overline{V}_c^2 - \frac{P_{dc}}{\omega C_b}\sin(2\omega t)}, \quad (3)$$

$$i_c = -\frac{P_{dc}\cos(2\omega t)}{\sqrt{\overline{V}_c^2 - \frac{P_{dc}}{\omega C_b}\sin(2\omega t)}}, \quad (4)$$

where $\overline{V}_c$ is the average voltage of $v_c$, which is a design variable.

With the steady-state voltage and current expressions given in Equations (1)-(4), the duty cycles of the active switches as well as the operating constraints of the rectifier 600 can be obtained. Denote the durations of State 1-State 4 in FIG. 9 as $d_1 T_s$, $d_2 T_s$, $d_3 T_s$ and $d_4 T_s$ respectively, where $T_s$ is a switching period. Then:

$$d_1+d_2+d_3+d_4=1. \quad (5)$$

From Table I, the duty cycles of the switches $S_A$ and $BS_B$ can be expressed as:

$$d_A=d_1+d_4, \quad (6)$$

$$d_B=d_1+d_3, \quad (7)$$

Based on FIG. 9, the state-space-averaged line current $i_{ac}$, load current $i_{dc}$ and capacitor current $i_c$ over $T_s$ can be calculated as (here, the averaging operator is omitted for simplicity):

$$|i_{ac}|=(d_1+d_4)i_L=d_A i_L, \quad (8)$$

$$i_{dc}=i_L, \quad (9)$$

$$i_c=(d_4-d_3)i_L=(d_A-d_B)i_L. \quad (10)$$

Equation (10) indicates that $i_c$ is positive (i.e., $C_b$ is charged when $d_3<d_4$ (or $d_B<d_A$), and vice versa, which demonstrates that active PPB is viable for this circuit.

The solution of Equations (8)-(10) leads to:

$$\begin{cases} d_A = \dfrac{|i_{ac}|}{i_L} = \dfrac{|i_{ac}|}{i_{dc}} \\ d_B = \dfrac{|i_{ac}|-i_c}{i_L} = \dfrac{|i_{ac}|-i_c}{i_{dc}} \end{cases}. \quad (11)$$

The duty cycles $d_A$ and $d_B$ in Equation (11) must be within the range of 0-100%. Hence, the operating constraints of the proposed rectifier can be resolved as $$\begin{cases} |i_{ac}| \leq i_{dc} + i_c \\ |i_{ac}| \geq i_c \\ |i_{ac}| \leq i_{dc} \end{cases}. \quad (12)$$

Further, a solution of $|i_{ac}|>i_c$ in Equation (12) utilizing Equations (1) and (4) indicates that $$\overline{V}_c > \frac{V_{ac}}{2}. \quad (13)$$

Meanwhile, a solution of $|i_{ac}|<i_{dc}$ in Equation (12) reveals that $$V_{dc} \leq \frac{V_{ac}}{2}. \quad (14)$$

According to the energy conservation principle, equation (2) can be rearranged as $$\underbrace{v_{ac}i_{ac}}_{P_{ac}} = \underbrace{v_{dc}i_{dc}}_{P_{dc}} + \underbrace{v_c i_c}_{P_r}. \quad (15)$$

By averaging Equation (15) over a line period $T_{line}$ while combining Equations (8) and (9), yields $$\langle v_{dc} \rangle_{T_{line}} = \frac{\langle d_B |v_{ac}| i_L \rangle_{T_{line}}}{\langle i_L \rangle_{T_{line}}}, \quad (16)$$

where $\langle \cdot \rangle_{Tline}$ is an averaging operator over $Ti_{me}$. Equation (16) indicates that the dc voltage conversion characteristics of the rectifier 600 of FIG. 6 has a similar form to that of a typical buck converter. Further, based on Equations (14) and (16), the rectifier 600 is capable of producing any output voltage lower than $V_{ac}/2$ provided that Equation (12) is satisfied.

In certain embodiments, switches $BS_B$ and $BS_C$ are controlled by gate signals that are generated in accordance with the following discussion. According to Equations (8)-(10), $d_1$, $d_2$, and $d_4$ can be expressed in terms of $d_3$ as:

$$\begin{cases} d_1 = \frac{|i_{ac}| - i_c}{i_{dc}} - d_3 \\ d_2 = \frac{i_{dc} - |i_{ac}|}{i_{dc}} - d_3 \\ d_4 = \frac{i_c}{i_{dc}} + d_3 \end{cases} \quad (17)$$

$$\begin{cases} d_1 + d_3 + d_4 = 1 \ (d_A + d_B \geq 1) \\ d_2 + d_3 + d_4 = 1 \ (d_A + d_B < 1) \end{cases}. \quad (18)$$

Further, a combination of Equations (17) and (18) leads to $d_1$-$d_4$ expressed as:

$$\begin{cases} d_1 = \frac{2|i_{ac}| - i_c - i_{dc}}{i_{dc}} \\ d_2 = 0 \\ d_3 = \frac{i_{dc} - |i_{ac}|}{i_{dc}} \quad (d_A + d_B \geq 1), \\ d_4 = \frac{i_{dc} - |i_{ac}| + i_c}{i_{dc}} \end{cases} \quad (19)$$

$$\begin{cases} d_1 = 0 \\ d_2 = \frac{i_{dc} - 2|i_{ac}| + i_c}{i_{dc}} \\ d_3 = \frac{|i_{ac}| - i_c}{i_{dc}} \quad (d_A + d_B < 1). \\ d_4 = \frac{|i_{ac}|}{i_{dc}} \end{cases} \quad (20)$$

Figure 11:
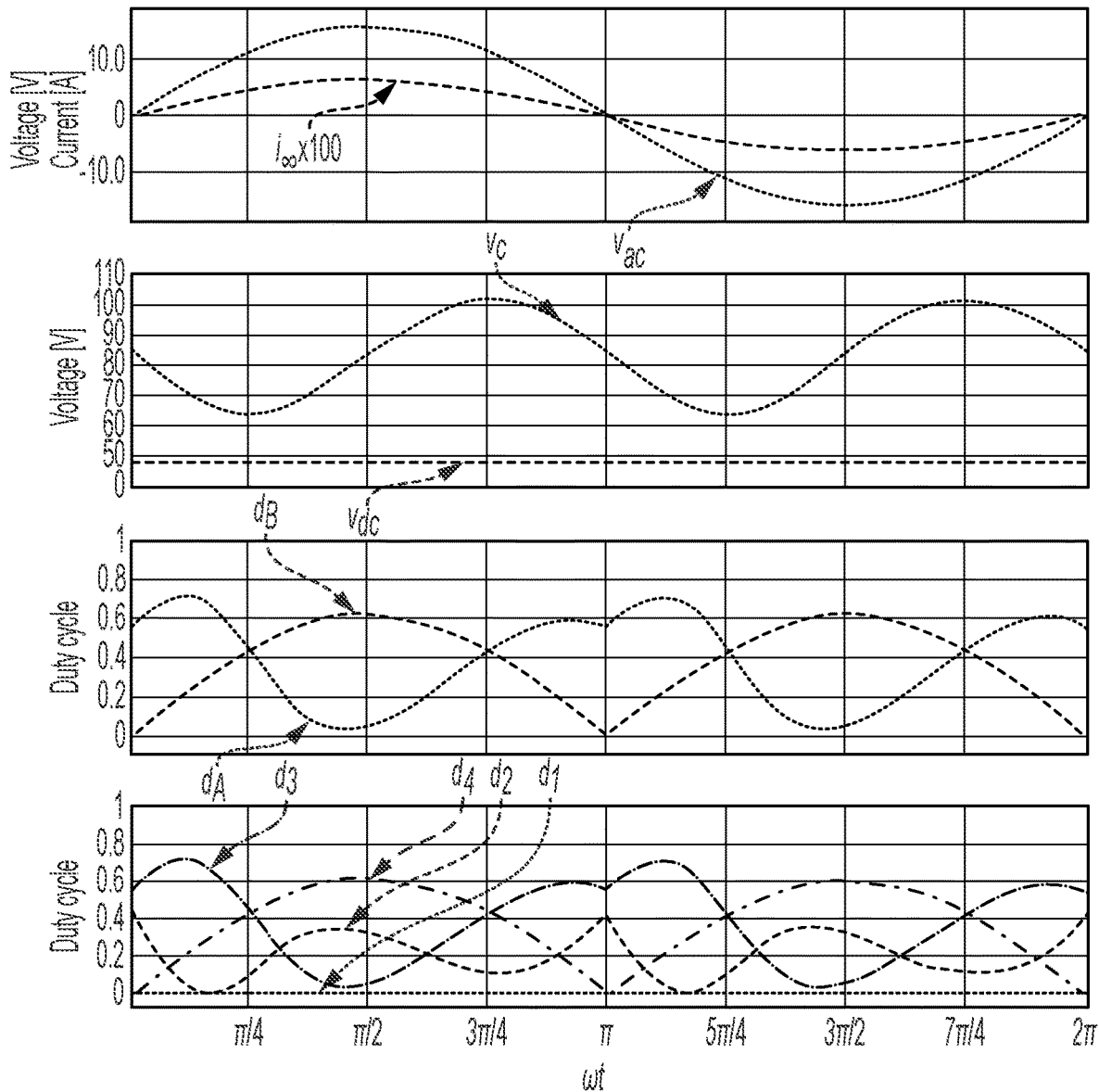
FIG. 11 depicts calculated waveforms of AC voltage $v_{ac}$ and current $i_{ac}$, DC voltage $v_{dc}$, buffer capacitor voltage $v_c$ and the duty cycles of switches $S_A$ and $S_B$: $d_A$ and $d_B$ in accordance with exemplary embodiments of the present application.

In FIG. 11, $d_1$-$d_4$, $d_A$ and $d_B$ are plotted versus $v_{ac}$, $i_{ac}$, $v_{dc}$ and $v_c$ over one line period based on Equations (1), (3), (4), (11), (19), (20) and the circuit specifications listed in Table II.

TABLE II

Circuit Specifications.

| Parameters | Values | Parameters | Values |
|---|---|---|---|
| Input ac RMS voltage | 110 V | Line frequency | 60 Hz |
| output dc voltage $V_{dc}$ | 48 V | Switching frequency $f_s$ | 50 kHz |
| Full output power | 48 W | Flying capacitor $C_b$ | CKG57NX7T2E335M500JH × 20 |
| Inductor L | 2300LL-102 | Output capacitor $C_{dc}$ | CKG57KX7S2A156M335JH |
| $D_1$-$D_4$, $D_A$ and $D_C$ | SBR10U200P5 | $S_A$-$S_C$ | EPC2010C |
| Input EMI filter | 2300LL-102 CKG57KX7T2J474M335JH | — | — |

Equation (17) indicates that there is freedom in choosing $d_3$. If phase-shifted modulation (which is commonly adopted for controlling multilevel converters to boost the effective switching frequency) is utilized, the active switching states are State 1, State 3 and State 4 when $d_A + d_B > 1$, and they become State 2, State 3 and State 4 when $d_A + d_B < 1$ (see FIGS. 10a and 10b, where $d_A$ and $d_B$ are modulated using two out-of-phase triangular carriers, Carrier_a and Carrier_b, respectively). In both scenarios shown in FIGS. 10a and 10b, the voltage across the inductor L from rectifier 600 (see FIG. 6) is switched between three voltage levels. Mathematically, FIGS. 10a and 10b indicate that:

FIG. 11 shows that a duty cycle of $d_A$ and $d_B$ are within 0-100%, indicating that the operating constraints are satisfied. Moreover, as $d_A + d_B < 1$ throughout $T_{line}$, $d_1$ is always equal to zero and switching State 1 (see FIG. 9) is deactivated.

Figure 12:
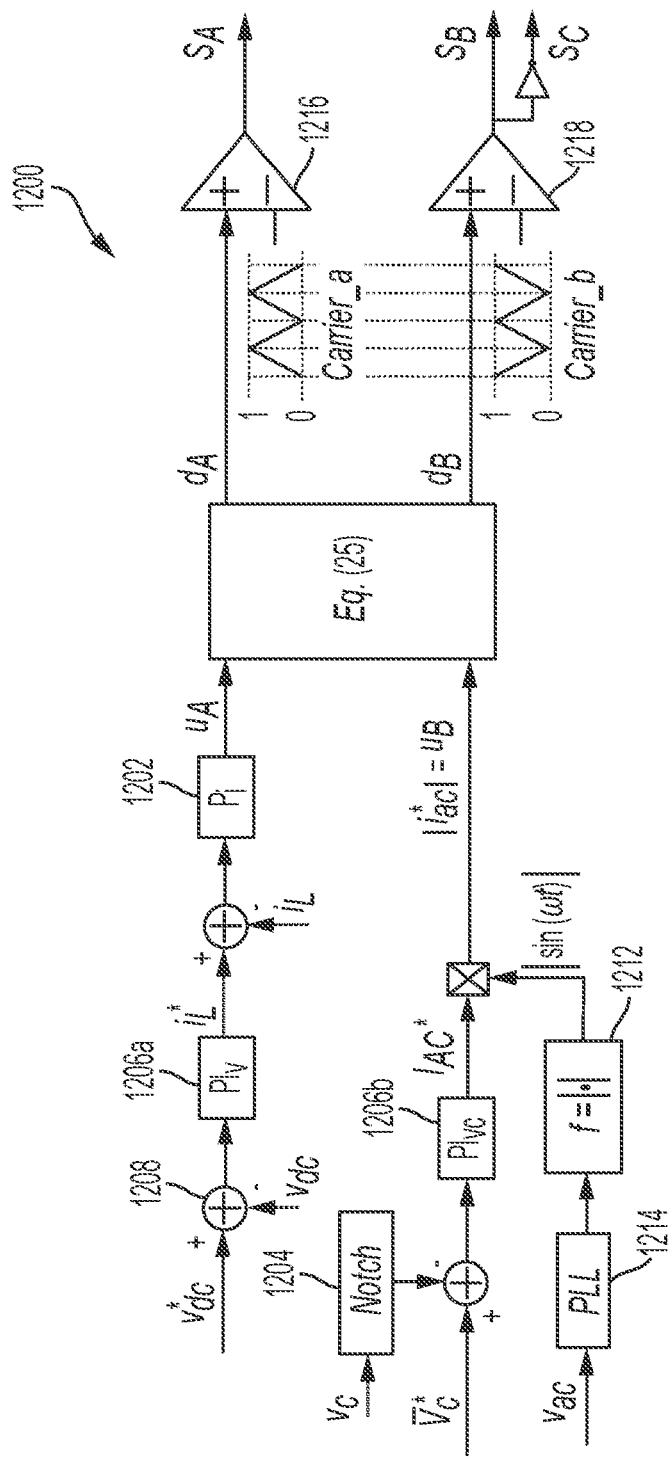
FIG. 12 depicts a controller for the power converter circuit of FIG. 6 in accordance with exemplary embodiments of the present application.

While $d_A$ and $d_B$ can be calculated based on Equation (11) for open-loop control of the rectifier 600 (see FIG. 6), the derivation of Equation (11) does not take into consideration the power losses, nonlinearities and component tolerances none of which are non-negligible in practical design. Thus, in certain embodiments, a closed-loop controller may be used to complement the system's operation. In a particular embodiment, as shown in FIG. 12, a nonlinear closed-loop control method based on Enhanced Automatic-Power-Decoupling (E-APD) controller 1200 is adopted. The design procedures of the controller 1200 are described as follows.

Based on States (1)-(4) from FIG. 9, the state-space-averaged equations of the proposed rectifier 600 (see FIG. 6) can be obtained as:

$$\begin{cases} L\dfrac{di_L}{dt} = (d_A - d_B)v_c + d_B|v_{ac}| - v_{dc} \\ C_{dc}\dfrac{dv_{dc}}{dt} = -\dfrac{v_{dc}}{R_{dc}} + i_L \\ C_b\dfrac{dv_c}{dt} = (d_B - d_A)i_L \end{cases} \quad (21)$$

Meanwhile, with reference to the E-APD controller 1200, the control outputs are selected as:

$$\begin{cases} y_1 = Li_L \\ y_2 = i_{ac} = d_B i_L \end{cases}, \quad (22)$$

which represents the dc-port and ac-port dynamics, respectively.

Equation (21) indicates that the system is highly coupled (between the system states and the control inputs $d_A$ and $d_B$) and highly nonlinear (due to the multiplying operation of the control inputs and the system states). The following equation is obtained by differentiating the first Equation of (22) over time:

$$\begin{cases} \dot{y}_1 = (d_A - d_B)v_c + d_B|v_{ac}| - v_{dc} \\ \dot{y}_2 = i_{ac} = d_B i_L \end{cases}. \quad (23)$$

If two new control inputs $u_A$ and $u_B$ are introduced such that $$\begin{cases} \dot{y}_1 = u_A \\ \dot{y}_2 = u_B \end{cases}, \quad (24)$$

then the original coupled and nonlinear system is now numerically transformed into two decoupled and linear subsystems. By solving Equations (23) and (24), the feedback-linearization-decoupling law to convert the new control inputs back to the original control inputs can be derived as $$\begin{cases} d_A = \dfrac{u_A + v_{dc} - \dfrac{u_B}{i_L}|v_{ac}|}{v_c} + \dfrac{u_B}{i_L} \\ d_B = \dfrac{u_B}{i_L} \end{cases}. \quad (25)$$

Figure 10:
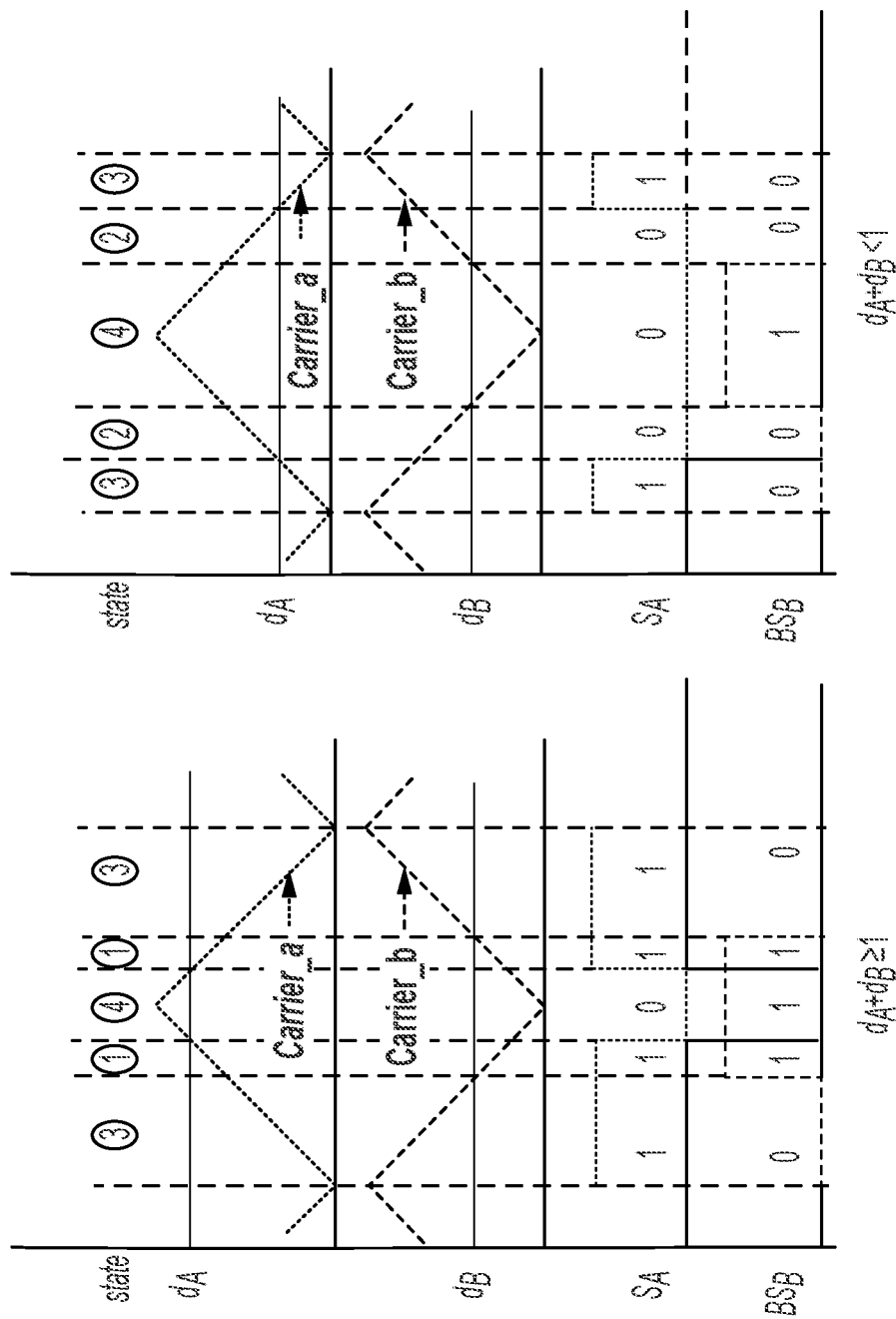
FIGS. 10a and 10b depict waveforms controlling the operating states of FIG. 9 in accordance with exemplary embodiments of the present application.

With reference to Equation (24), the control of the rectifier 600 (see FIG. 6) can be achieved using simple linear controllers. As shown in FIG. 12, $u_A$ is obtained using a proportional controller $P_i$ 1202, while $u_B$ is directly derived from $|i_{ac}^*|$ based on Equation (22). Once $u_A$ and $u_B$ are known, $d_A$ and $d_B$ can be calculated using Equation (25) for generating gate driving signals (as shown in FIGS. 10a and 10b). In FIG. 12, the reference signal $i_L^*$ is obtained from an outer voltage loop 1208 regulating $v_{dc}$ at $v_{dc}^*$, while $|i_{ac}|$ is derived from a second voltage loop 1210 regulating $\overline{V}_c$ at $\overline{V}_c^*$. Here, a notch filter 1204 with a stopping band at a double-line frequency 1212 is employed to extract V. Additionally, a Phase Lock Loop (PLL) 1214 may be used to determine phase information of a grid voltage $v_{ac}$ that can be used to generate a reference signal for controlling a grid current. Further, amplifiers 1216 and 12128 may be used to modulate control signals $d_A$ and $d_B$ into digital form in order to operate semiconductor switches in the rectifier 600. In certain embodiments, the design of the PI controllers 1206a and 1206b for the two voltage regulation loops and that of the Pi controller 1202 for the current regulation loop follow that of a conventional linear controller and are not detailed here.

Designing and building the rectifier 600 (see FIG. 6) requires balancing several design considerations. A particular design consideration is the design of the active switches and diodes. In order to make proper design considerations, the voltages in the power devices during the various States 1-4 of FIG. 9 should be understood. Table III summarizes the voltages across each power device during States 1-4 of FIG. 9.

TABLE III

Voltage stresses and maximum voltage stress for $S_A$, $D_A$, $S_B$, $D_B$, $S_C$ and $D_C$.

| Operating State | $S_A$ | $D_A$ | $BS_B$ | | $BS_C$ | |
|---|---|---|---|---|---|---|
| State 1 | 0 | $v_c$ | 0 | | $\|v_{ac}\| - v_c$ | |
| State 2 | $v_c$ | 0 | $\|v_{ac}\| - v_c$ | | 0 | |
| State 3 | 0 | $v_c$ | $\|v_{ac}\| - v_c$ | | 0 | |
| State 4 | $v_c$ | 0 | 0 | | $\|v_{ac}\| - v_c$ | |
| Minimum voltage rating | $V_A$ | $V_A$ | $S_B$ $V_{B+}$ | $D_B$ $V_{B-}$ | $S_C$ $V_{B-}$ | $D_C$ $V_{B+}$ |

Figure 13:
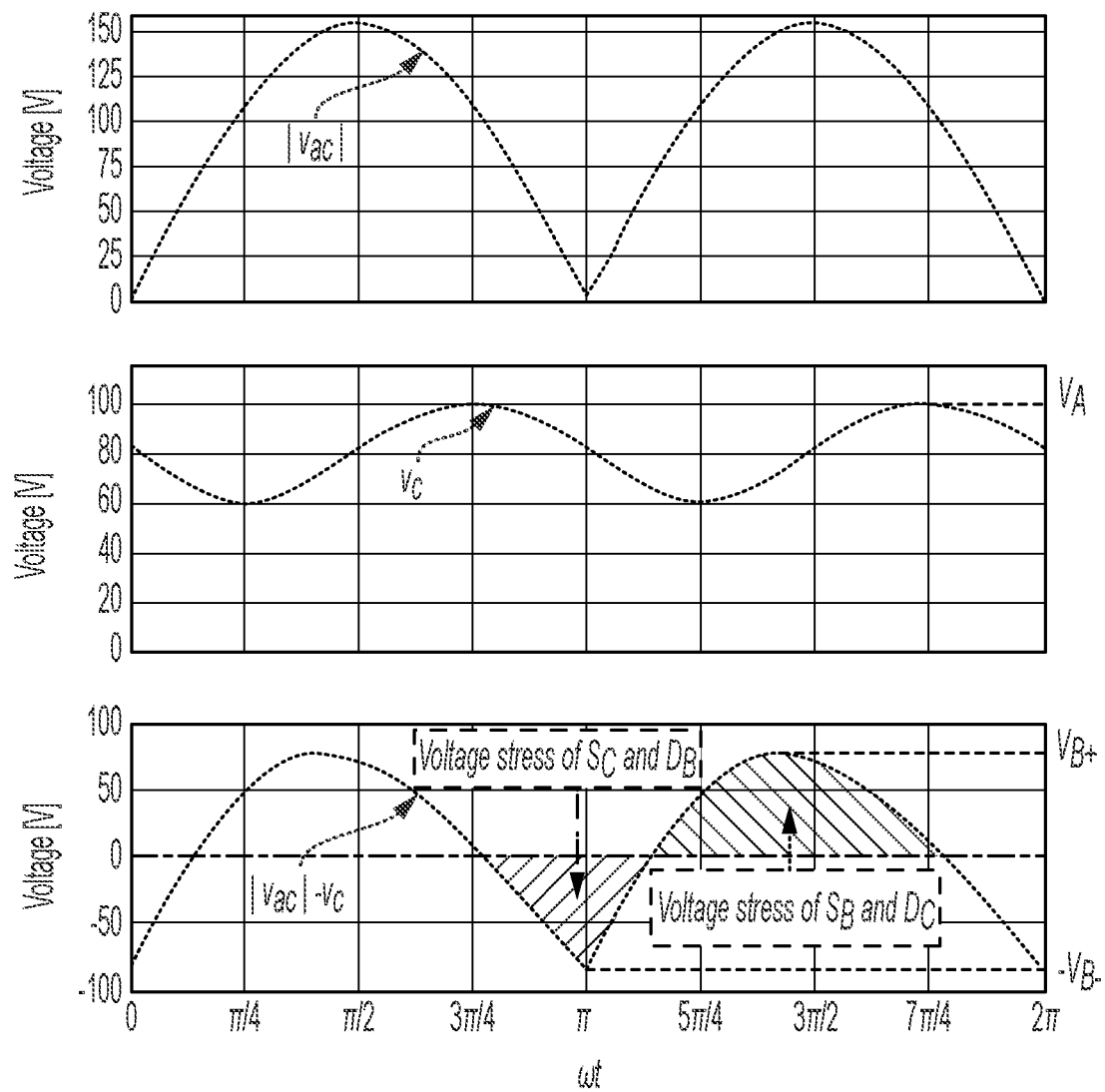
FIG. 13 depicts voltage waveforms with respect to operation of the power converter circuit of FIG. 6 in accordance with exemplary embodiments of the present application.

As shown, the minimum voltage ratings of $S_A$ and $D_A$ (i.e., $V_A$) are the peak voltage of $v_c$. Accordingly, from Equation (3), $V_A$ can be expressed as $$V_A = \max_{0 \le t \le T_{line}}\{v_c\} = \sqrt{\overline{V}_c^2 + \dfrac{P_{dc}}{\omega C_b}}, \quad (26)$$

which is highlighted in FIG. 13. Additionally, Table III shows that the voltage stresses across the two bi-quadrant switches $BS_B$ and $BS_C$ of the rectifier 600 of FIG. 6 are $|v_{ac}|-v_c$ which is bipolar according to FIG. 13.

Further, because $S_C$ and $D_B$ are ON when $|v_{ac}|-v_c \ge 0$, the minimum voltage ratings of $S_B$ and $D_C$ (i.e., $VB_+$) are:

$$V_{B+} = \max_{0 \le t \le T_{line}}\{|v_{ac}| - v_c\} = \quad (27)$$

$$\max_{0 \le t \le T_{line}}\left\{|V_{ac} \sin \omega t| - \sqrt{\overline{V}_c^2 - \dfrac{P_{dc}}{\omega C_b}\sin(2\omega t)}\right\}.$$

Similarly, when $|v_{ac}|-v_c<0$, $S_B$ and $D_C$ are ON, the minimum voltage ratings of $S_C$ and $D_B$ (i.e., $V_{B-}$) then equal to:

$$V_{B-} = \max_{0 \le t \le T_{line}}\{v_c - |v_{ac}|\} = \quad (28)$$

-continued $$\max_{0 \le t \le T_{line}} \left\{ \sqrt{\overline{V}_c^2 - \frac{P_{dc}}{\omega C_b} \sin(2\omega t)} - |V_{ac} \sin \omega t| \right\} = \overline{V}_c.$$

Figure 14A:
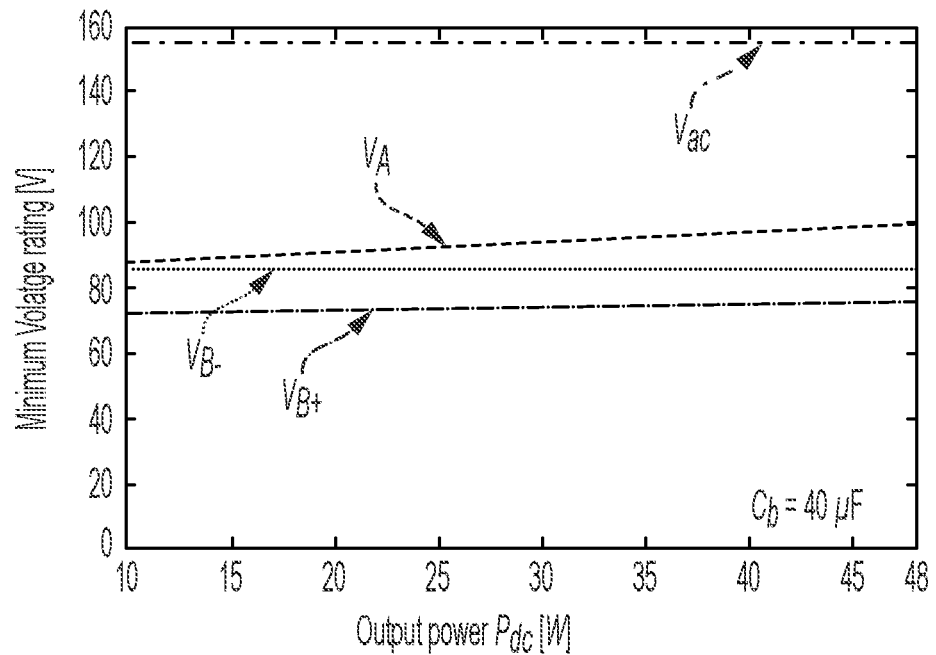
FIGS. 14a and 14b depict a minimum voltage rating against an output power and flying capacitance for the power converter circuit of FIG. 6 in accordance with exemplary embodiments of the present application.
Figure 14B:
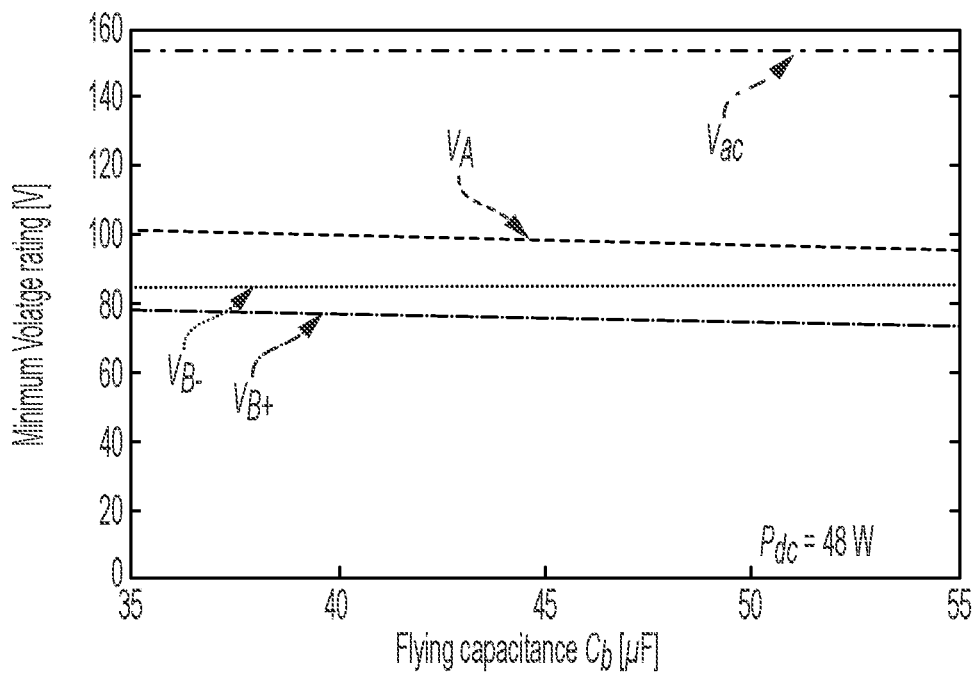

With the aid of Equations (26)-(28), $V_A$, $V_{B+}$ and $V_{B-}$ can be plotted against the output power and the capacitance of $C_b$. The results are shown in FIGS. 14a and 14b and are compared against $V_{ac}$, where $V_{ac}=110\sqrt{2}$ V, $V_{dc}=48$ V, and $\overline{V}_c=82$ V. According to FIGS. 14a and 14b, the following observations can be made:

(1) In FIG. 14a, $V_A$ and $V_{B+}$ scale monotonically with $P_{dc}$, while $V_{B-}$ is constant and equals to $\overline{V}_c$. The increase of $V_A$ and $V_{B+}$ with $P_{dc}$ is due to the increased voltage ripple $\Delta v_c$ as $P_{dc}$ increases. Consequently, $V_A$ and $V_{B+}$ should be designed at full power.

(2) In FIG. 14b, $V_A$ and $V_{B+}$ decreases with the increase of capacitance $C_b$ for a constant $P_{dc}$, while $V_{B-}$ still equals to $\overline{V}_c$. The decrease of $V_A$ and $V_{B+}$ is due to a smaller $\Delta v_c$ when a larger capacitance $C_b$ is used.

(3) In a particular embodiment of the application where $\overline{V}_c$ is selected close to half of $V_{ac}$ (i.e., $\overline{V}_c=0.53\ V_{ac}$), $V_A$, $V_{B+}$ and $V_{B-}$ are also found to be close to half of $V_{ac}$ for a wide range of $P_{dc}$ and $C_b$. In contrast, the voltage stresses of all power devices in a conventional buck PFC rectifier are $V_{ac}$. That is, the voltage stresses in the rectifier 600 (see FIG. 6) are almost halved as compared to that of a conventional buck PFC rectifier. On the other hand, as the inductor L current $i_L$ (see FIG. 9) flows through each switching component according to FIG. 9, the minimum current ratings $I_{stress}$ for all the switching devices are identical and equal to the peak of $i_L$, as shown by:

$$I_{stress} = \max_{0 \le t \le T_{line}} \{i_L\} = \frac{V_{dc}}{R_{dc}} + \frac{\Delta i_{L\_rated}}{2}, \quad (29)$$

where $\Delta i_L$ rated is the rated high-frequency inductor current ripple.

Another design consideration is that of the flying capacitance $C_b$. The design of $C_b$ is essentially a compromise between system power density and system operating constraints. In particular, $C_b$ should be minimized while satisfying the constraints of Equation (12). A combination of Equations (1), (4) and (12) leads to the design constraint for $C_b$ as:

$$C_b \ge \max\{C_{b1}, C_{b2}\}, \quad (30)$$
where $$C_{b1} = \max_{\omega t \in (0, \frac{\pi}{4})} \left( \frac{P_{dc} \sin(2\omega t)}{\omega \left( \overline{V}_c^2 - \left( \frac{\cos(2\omega t)}{\frac{1}{V_{dc}} - \frac{2}{V_{ac}}|\sin \omega t|} \right)^2 \right)} \right), \text{ and} \quad (31)$$

$$C_{b2} = \max_{\omega t \in (\frac{\pi}{4}, \frac{3\pi}{4})} \left( \frac{P_{dc} \sin(2\omega t)}{\omega \left( \overline{V}_c^2 - \frac{V_{ac}^2 \cos^2(2\omega t)}{4 \sin^2 \omega t} \right)} \right). \quad (32)$$

For instance, in a particular embodiment, where $P_{dc}=48$ W, $V_{dc}=48$ V, $V_{ac}=110\sqrt{2}$ V, and $\overline{V}_c=83$ V, would result in $C_{b1}=19.4$ μF and $C_{b2}=31.4$ μF. Therefore, $C_b=40$ μF is selected in this design.

Another design consideration is that of the inductor L of the rectifier 600 from FIG. 6. The inductor L should be designed such that (i) the rectifier 600 operates in the CCM and (ii) the peak-to-peak switching-frequency inductor current ripple $\Delta i_L$ is less than a pre-specified value $\Delta i_{L\_rated}$. The CCM of operation requires that:

$$\Delta i_L < 2i_L. \quad (33)$$

Therefore, to ensure a CCM of operation, $\Delta i_{L\_rated}$ should follow:

$$\Delta i_{L\_rated} < \frac{2V_{dc}}{R_{dc}}. \quad (34)$$

Figure 15:
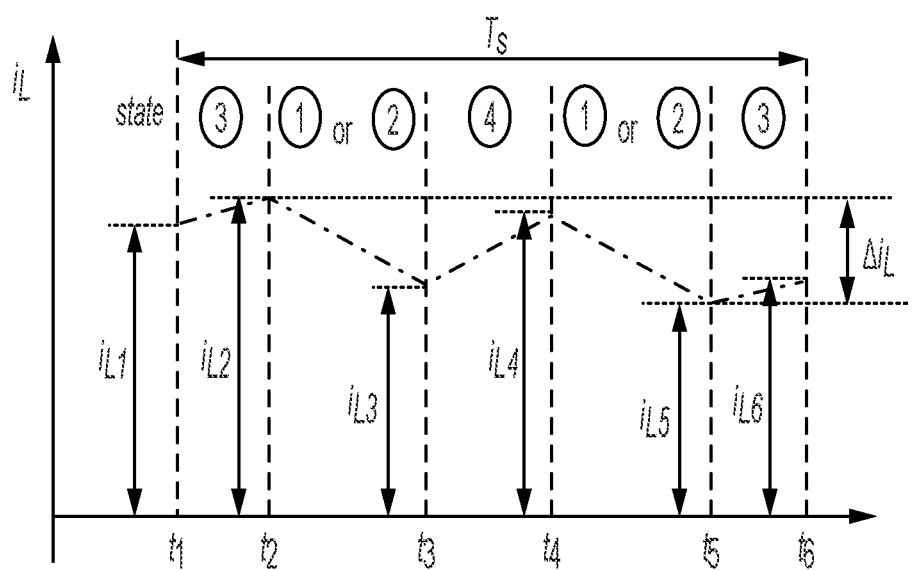
FIG. 15 depicts an inductor current during operating states of the power converter of FIG. 6 in accordance with exemplary embodiments of the present application.

To satisfy design criteria (ii), $\Delta i_L$ needs to be resolved. The schematic waveform of $i_L$ within one switching cycle $T_s$ is depicted in FIG. 15. As shown in FIG. 15, at time instances $t_1$-$t_6$, $i_L$ reaches its local peak/valley with a value of $i_{Ln}$, respectively, where n ∈ {1, 2, 3, 4, 5, 6}, and $$i_{L(m+1)} = i_{Lm} + \Delta i_{Lm}, \ m \in \{1,2,3,4,5\}. \quad (35)$$

with $\Delta i_{Lm}$ being the incremental inductor current during the interval from $t_m$ to $t_{m+1}$. According to the annotated switching states in FIG. 15 and the corresponding inductor voltage in Table I, $\Delta i_{Lm}$ can be derived as:

$$\begin{cases} \Delta i_{L1} = \frac{\gamma_1}{L} = \frac{d_3 T_s (v_c - v_{dc})}{2L} \\ \Delta i_{L2} = \frac{\gamma_2}{L} = \begin{cases} \frac{d_1 T_s (|v_{ac}| - v_{dc})}{2L} & (d_A + d_B \ge 1) \\ -\frac{d_2 T_s v_{dc}}{2L} & (d_A + d_B < 1) \end{cases} \\ \Delta i_{L3} = \frac{\gamma_3}{L} = \frac{d_4 T_s}{L}(|v_{ac}| - v_c - v_{dc}) \\ \Delta i_{L4} = \frac{\gamma_4}{L} = \begin{cases} \frac{d_1 T_s (|v_{ac}| - v_{dc})}{2L} & (d_A + d_B \ge 1) \\ -\frac{d_2 T_s v_{dc}}{2L} & (d_A + d_B < 1) \end{cases} \\ \Delta i_{L5} = \frac{\gamma_5}{L} = \frac{d_3 T_s (v_c - v_{dc})}{2L} \end{cases} \quad (36)$$

Therefore, $\Delta i_L$ during the kth switching cycle is:

$$\Delta i_L[k] = \max\{i_{L1}[k], L\ i_{L6}[k]\} - \min\{i_{L1}[k], L\ i_{L6}[k]\} \quad (37)$$

which is a function of L. The minimum inductance $L_{min}$ can be obtained by equating the maximum $\Delta i_L$ over $T_{line}$ to $\Delta i_{L\_rated}$. With the aid of Equations (1), (4), (19) and (20), $L_{min}$ is resolved as:

$$L_{min} = \frac{1}{\Delta i_{L\_rated}} \max_{k \in [1, \frac{T_{line}}{T_s}]} (\max\{0, \Sigma_1^{i=1} \gamma_i[k], \cdots \Sigma_1^{i=5} \gamma_i[k]\} - \min\{0, \Sigma_1^{i=1} \gamma_i[k], \cdots \Sigma_1^{i=5} \gamma_i[k]\}). \quad (38)$$

Figure 16A:
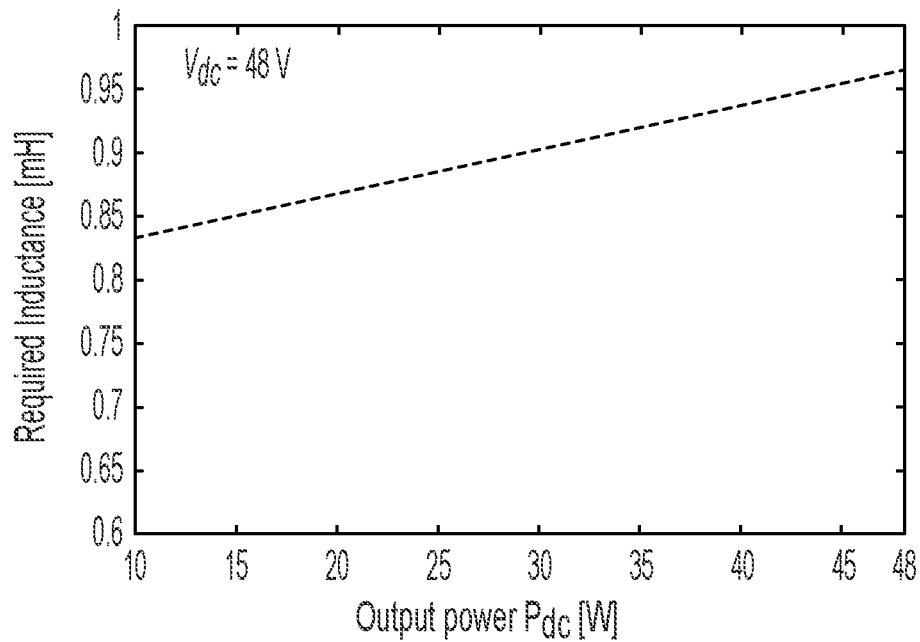
FIGS. 16a and 16b depict a required inductance waveform plotted against an output voltage and an output power for the power converter circuit of FIG. 6 in accordance with exemplary embodiments of the present application.
Figure 16B:
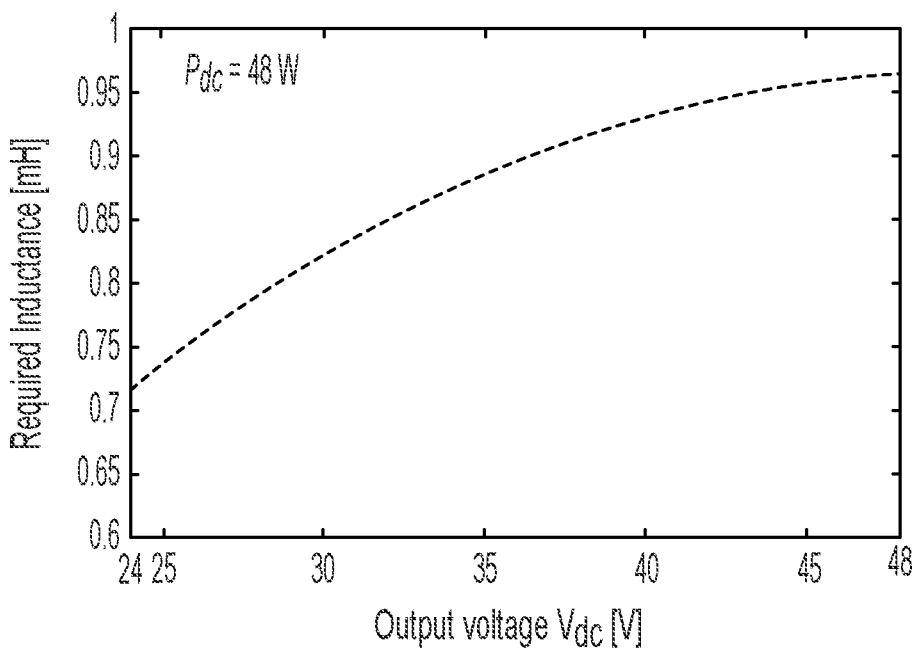

FIGS. 16a and 16b illustrate the calculated $L_{min}$ against $P_{dc}$ and $V_{dc}$, respectively. In the illustrated embodiment, a switching frequency of $f_s$==kHz, $\Delta i_{L\_rated}=0.6$ A, $C_b=40$ μF, $V_{ac}=11\sqrt{2}$ V, and $\overline{V}_c=83$ V are utilized in the calculation. FIGS. 16a and 16b shows that $L_{min}$ scales proportionally with $P_{dc}$ and $V_{dc}$. Therefore, $L_{min}$ should be selected at full power and maximum $V_{dc}$. In a particular embodiment, $L_{min}=0.965$ mH is needed for a 48-W/48-V system. Therefore, L=1 mH is selected in this particular design.

Returning briefly to FIG. 6, it will be appreciated that the schematic circuit diagram of FIG. 6 is merely an exemplary single converter configuration, and that a number of converters with different switch realizations are also viable. For example, in one version of the rectifier 600, the four diodes in the diode bridge rectifier of the second current switching network may be replaced by four controlled switches in order to improve the power conversion efficiency of the rectifier 600. To give another example, in another version of the rectifier 600, the relative position between $D_C$ and $S_C$ may be swapped so that the source terminal of the controlled switch $S_C$ is connected to the negative terminal of the floating capacitor $C_b$ 610 and thereby simplifying the gate driver circuit design. To give yet another example, as a further alternative, the controlled switch $S_B$ may be replaced by a voltage-bidirectional switch, for example, using a diode and a controlled switch arranged in a back-to-back configuration, so that the diodes $D_1$-$D_4$ are commuting at the AC line frequency. An advantage of this switch realization is that a common line-frequency-commuted diode bridge rectifier can be used in the circuit, which is cheaper and has reduced power losses relative to a high-frequency-commuted diode bridge rectifier.

Staying with FIG. 6, and in a further exemplary embodiment, all the diodes depicted in FIG. 6 may be replaced by controlled switches, and all the controlled switches are replaced by diodes for DC/AC inverter applications (see FIGS. 17 and 18 below). In yet another further exemplary embodiment, all the diodes depicted in FIG. 6 are replaced by controlled switches for bidirectional power conversion applications (see FIG. 4). In yet another further exemplary embodiment, the controlled switch $S_A$ in FIG. 4 may be replaced by a voltage-bidirectional switch, for example, using a pair of controlled switches arranged in a back-to-back configuration, so that the controlled switches S1-S4 are commuting at the AC line frequency (see FIG. 5).

Figure 17:
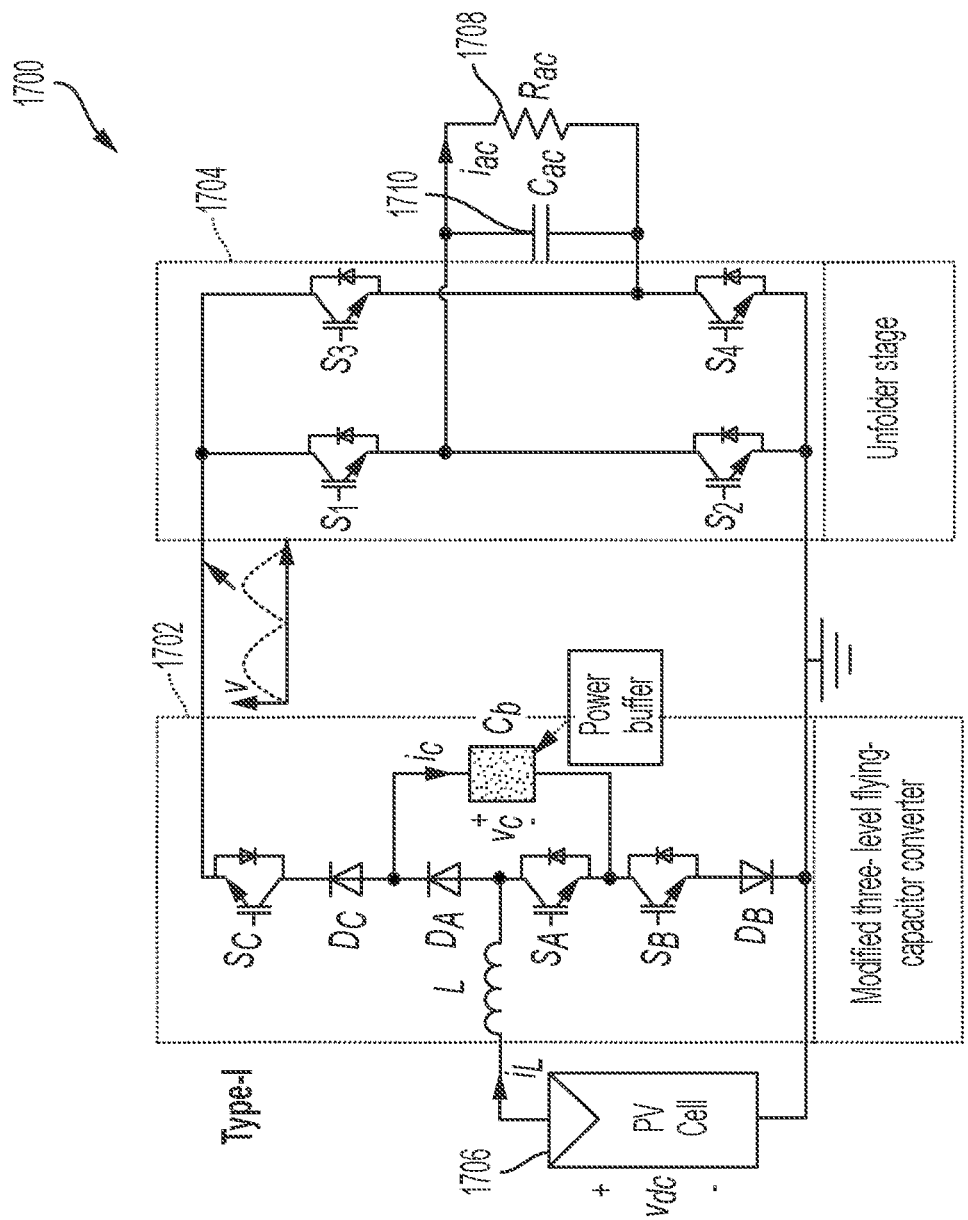
FIG. 17 depicts an example of a power converter circuit in accordance with exemplary embodiments of the present application.
Figure 18:
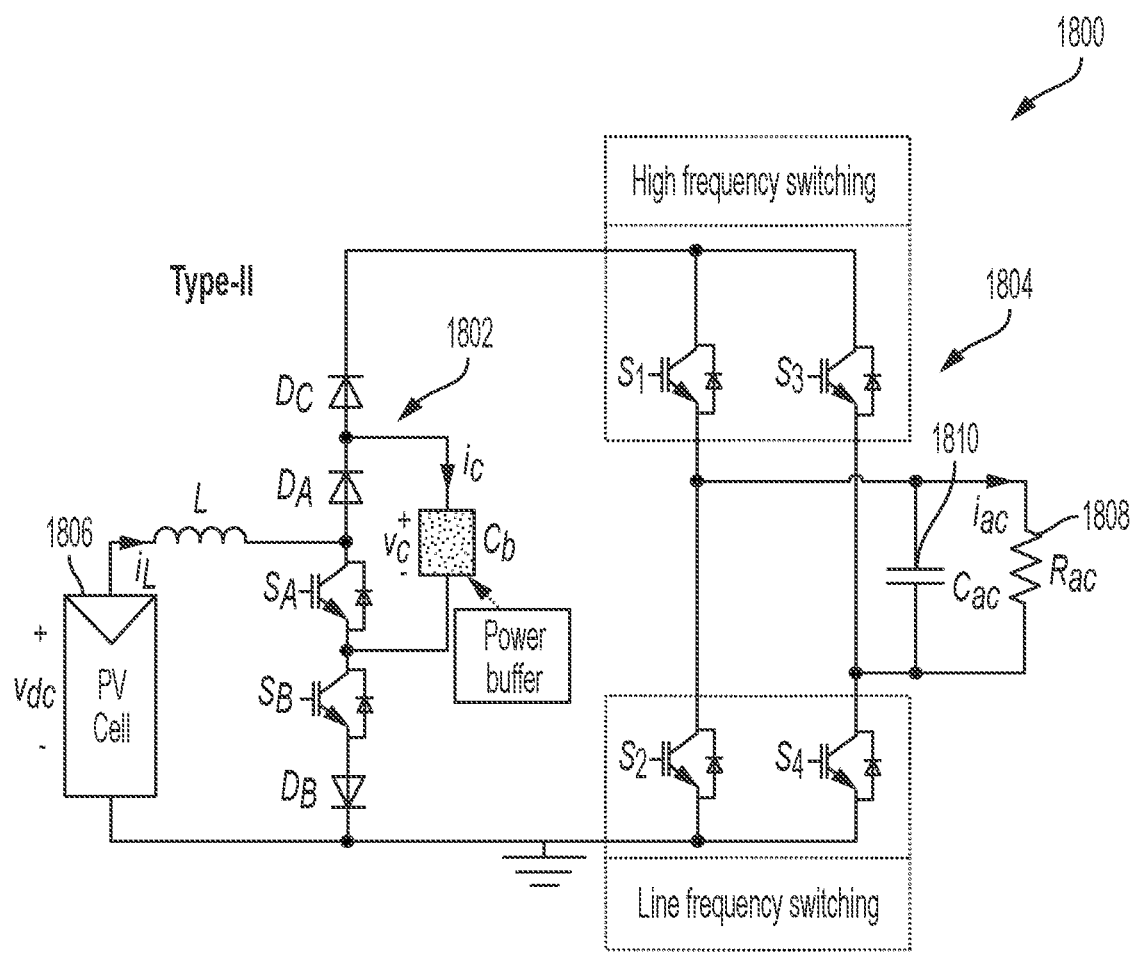
FIG. 18 depicts an example of a power converter circuit in accordance with exemplary embodiments of the present application.

FIG. 17 illustrates a power converter 1700 similar to the power converter 200 of FIG. 2 but implemented as a unidirectional power converter for DC to AC power conversion. The converter 1700 is specifically arranged as a single-phase three-level flying-capacitor step-up PV micro-inverter 1700 used as an example to illustrate operating principles of an exemplary embodiment of the present application. FIG. 18 illustrates a second exemplary embodiment in the form of a single-phase three-level flying-capacitor step-up PV micro-inverter 1800.

Inverter 1700 includes a modified three-level flying-capacitor (MTLFC) dc-dc stage 1702 cascaded by an H-bridge line-frequency unfolder stage 1704 driven by a DC voltage ($v_{dc}$) provided by a PV Cell 1706 in the illustrated embodiment. A load 1708 can be a pure resistor (shown in FIG. 17 as $R_{ac}$), or other types of load, including but not limited to an AC grid or any other type of nonlinear load. An interfacing EMI filter 1710 is provided before the load 1708, and, in the illustrated embodiment of FIG. 17, is $C_{ac}$, but could be other types of filters, including an inductor-capacitor (LC) filter or an inductor-capacitor-inductor (LCL) filter. The MTLFC stage 1702 is similar to the conventional three-level flying-capacitor boost converter 200 (see FIG. 2), except for an extra active switch $S_C$ and a diode $D_B$ being added.

In another embodiment, the active switch $S_C$ of inverter 1700 can be further integrated with the unfolder stage 1704 to further reduce the component count. This embodiment is illustrated as inverter 1800 in FIG. 18. Similar to inverter 1700, inverter 1800 includes a modified three-level flying-capacitor (MTLFC) dc-dc stage 1802 cascaded by a line-frequency unfolder stage 1804 driven by a DC voltage ($v_{dc}$) provided by a PV Cell 1806 in the illustrated embodiment. A load 1808 can be a pure resistor (shown in FIG. 18 as $R_{ac}$), or other types of load, including but not limited to an AC grid or any other type of nonlinear load. An interfacing EMI filter 1810 is provided before the load 1808, and, in the illustrated embodiment of FIG. 18, is $C_{ac}$, but could be other types of filters, including an inductor-capacitor (LC) filter or an inductor-capacitor-inductor (LCL) filter. The MTLFC stage 1802 is similar to the conventional three-level flying-capacitor boost converter 200 (see FIG. 2), except for a diode $D_B$ being added.

In contrast with inverter 1700 (see FIG. 17), inverter 1800 operates its unfolder stage 1804 such that $S_1$ and $S_3$ are high-frequency switches, while $S_2$ and $S_4$ remain at line-frequency operation. Otherwise, inverter 1800 has similar operating principles to that of inverter 1700 but saves one active switch (shown as $S_C$ in FIG. 17). However, with the inverter 1700 configuration, the unfolder stage 1702 is more symmetrical, which may ease restraints on an integration/packaging process and lead to a more modular design. Accordingly, use of either one of inverter 1700 or inverter 1800 will depend on overall design considerations.

Figure 19:
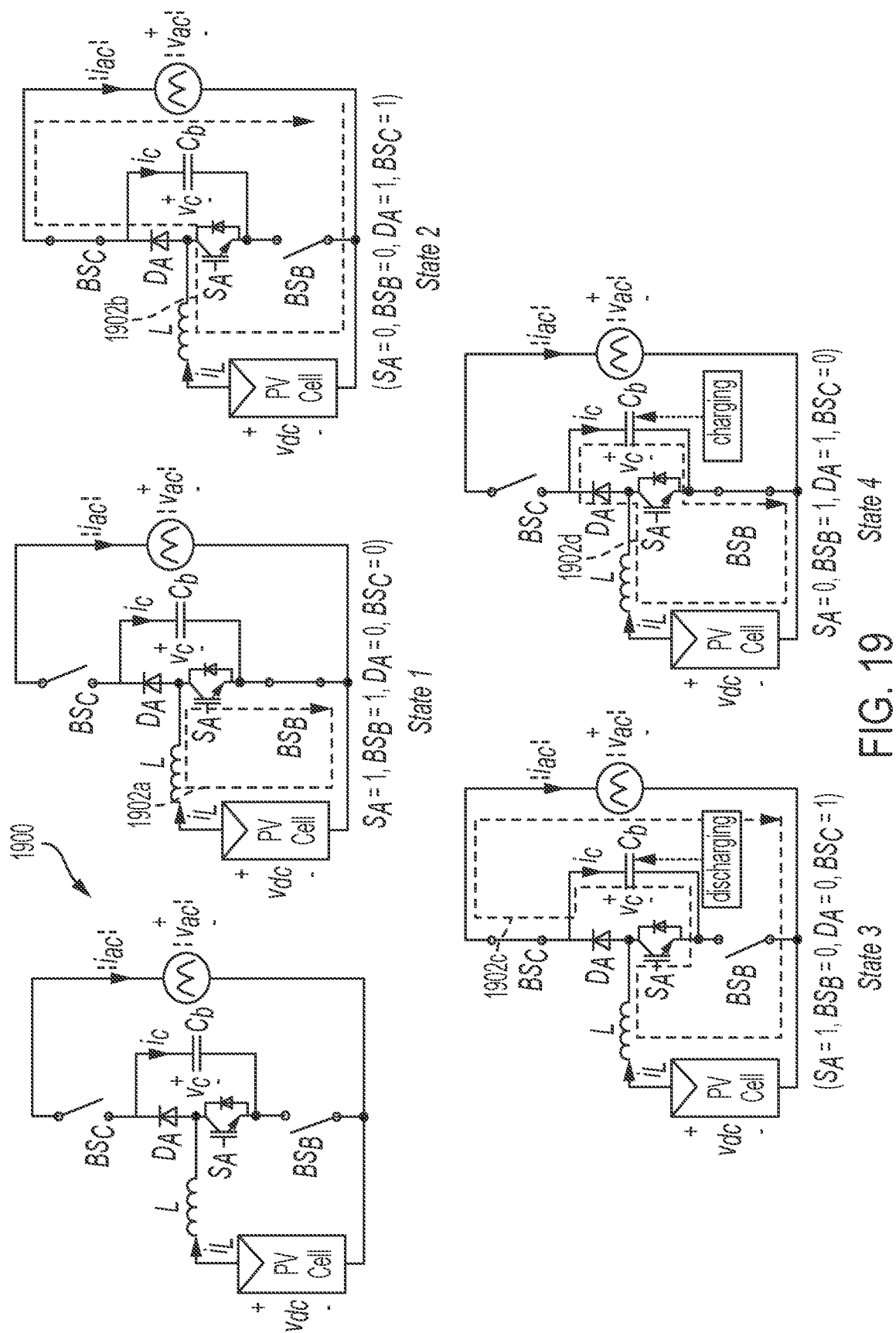
FIG. 19 depicts a simplified circuit of the power converter circuit of FIG. 17 and operational states of the simplified circuit in accordance with exemplary embodiments of the present application.

FIG. 19 illustrates an equivalent circuit 1900 that approximates the operation of inverter 1700 (see FIG. 17). The following provides a two-step procedure for transforming the inverter 1700 to the equivalent circuit 1900:

Step 1 is to represent the H-bridge unfolder circuit 1704 and the line voltage $v_{ac}$ by a rectified sinusoidal voltage source $|v_{ac}|$ 1902; and Step 2 is to use a bi-quadrant switch (BS) to represent a series connection of a MOSFET (S) and a diode (D). A bi-quadrant switch can block voltage bi-directionally whilst conducting a positive current. Therefore, $S_B$ and $D_B$ of the MTFLC stage 1702 (see FIG. 17) are represented by $BS_B$, and $S_C$ and $D_C$ of the MTFLC stage 1702 are represented by $BS_C$.

An equivalent circuit similar equivalent circuit 1900 could be developed for inverter 1800 (see FIG. 18) in accordance with the above two-step transformation procedure. However, for the sake of brevity, the description of that process is not specifically detailed and could be performed similarly to the above two-step process.

FIG. 19 further illustrates four operational states (State 1-State 4) of equivalent circuit 1900 based on a switch condition on the switches $BS_B$ and $BS_C$. In FIG. 19, the bi-quadrant switches $BS_B$ and $BS_C$ are switched complementarily. Assuming a continuous-conduction-mode (CCM) of operation, the equivalent circuit 1900 has four switching states (see States 1-4). In State 1 and State 2, based on power flow paths 1902a and 1902b, an inductor L is energized by $v_{dc}$ (State 1 with power flow path 1902a) and de-energized to the $|v_{ac}|$ (State 2 with power flow path 1902b), while $C_b$ is not involved in circuit operation. These two switching states are identical to those of a boost converter. In State 3 and State 4, $C_b$ part of the power flow paths 1902c and 1902d. Specifically, $C_b$ is discharged by $i_L$ in State 3 with power flow path 1902c and charged by $i_L$ in State 4 with power flow path 1902d. Thus, an extra capacitor charging state and a discharging state are created in States 3 and 4. By controlling the duration of State 3 and State 4, an amount of power flowing into/out of $C_b$ can be actively controlled, thereby achieving active PPB.

The following provides a steady state analysis of the inverter 1700 based on the equivalent circuit 1900 operation shown in States 1-4 of FIG. 19. In the following analysis, it is assumed that a unity power factor and that $v_{ac}$ and $i_{ac}$ are pure sinusoidal waveforms, as follows:

$$\begin{cases} v_{ac} = V_{ac} \sin \omega t \\ i_{ac} = I_{ac} \sin \omega t \end{cases} \quad (1)$$

where $V_{ac}$ and $I_{ac}$ are the amplitudes of $v_{ac}$ and $i_{ac}$ respectively, and $\omega$ is the line frequency. Accordingly, an instantaneous output power $p_{ac}$ is represented by:

$$p_{ac} = v_{ac}i_{ac} = \underbrace{\frac{V_{ac}I_{ac}}{2}}_{P_{dc}} - \underbrace{\frac{V_{ac}I_{ac}}{2}\cos(2\omega t)}_{p_r}. \quad (2)$$

$p_{ac}$ consists of a constant dc power $P_{dc}$ and a double-line-frequency pulsating power $p_r$. Assuming that $p_r$ is fully buffered by $C_b$, the voltage and current of $C_b$ can be further calculated as:

$$v_c = \sqrt{\overline{V}_c^2 + \frac{P_{dc}}{\omega C_b}\sin(2\omega t)}, \quad (3)$$

$$i_c = \frac{P_{dc}\cos(2\omega t)}{\sqrt{\overline{V}_c^2 + \frac{P_{dc}}{\omega C_b}\sin(2\omega t)}}, \quad (4)$$

where $\overline{V}_c$ is the average voltage of $v_c$, which is a design variable.

With the voltage and current expressions given in Equations (1)-(4), duty cycles of the active switches as well as the operating constraints of the inverter 1700 (see FIG. 17) can be obtained. The duration of State 1-State 4 in FIG. 19 are indicated as $d_1T_s$, $d_2T_s$, $d_3T_s$ and $d_4T_s$ respectively, where $T_s$ is a switching period. Accordingly, the total duration of operation for a full cycle can be represented as:

$$d_1+d_2+d_3+d_4=1. \quad (5)$$

The duty cycles of the switches $S_A$ and $BS_B$ can be expressed as $$d_A=d_1+d_3, \quad (6)$$

$$d_B=d_1+d_4. \quad (7)$$

Based on FIG. 19, a state-space-averaged line current $i_{ac}$, input dc current $i_{dc}$ and capacitor current $i_c$ over $T_s$ can be calculated as (here, the averaging operator is omitted for simplicity):

$$|i_{ac}|=(d_2+d_3)i_L=(1-d_B)i_L, \quad (8)$$

$$d_c=i_L, \quad (9)$$

$$i_c=(d_4-d_3)i_L=(d_B-d_A)i_L. \quad (10)$$

From Equation (10), $i_c$ is positive (i.e., $C_b$ is charged) when $d_3<d_4$ (or $d_A<d_B$), and vice versa.

Solving Equations (8)-(10) leads to:

$$\begin{cases} d_A = 1 - \frac{|i_{ac}|+i_c}{i_{dc}} \\ d_B = 1 - \frac{|i_{ac}|}{i_{dc}} \end{cases} \quad (11)$$

The duty cycles $d_A$ and $d_B$ in Equation (11) must be within the range of 0-100%. Hence, operating constraints of the proposed inverter can be resolved as:

$$\begin{cases} |i_{ac}|+i_c \le i_{dc} \\ |i_{ac}| \ge -i_c \\ |i_{ac}| \le i_{dc} \end{cases} \quad (12)$$

A solution of $|i_{ac}|>i_c$ in Equation (12) utilizing Equations (1) and (4) reveals the design constraint of $\overline{V}_c$ as:

$$\overline{V}_c > \frac{V_{ac}}{2}. \quad (13)$$

Meanwhile, a solution of $|i_{ac}|<i_{dc}$ in Equation (12) indicates a constraint between input and output voltage as:

$$V_{dc} \le \frac{V_{ac}}{2}. \quad (14)$$

Additionally, Equation (2) can be rearranged as:

$$\underbrace{v_{ac}i_{ac}}_{p_{ac}} = \underbrace{v_{dc}i_{dc}}_{P_{dc}} - \underbrace{v_ci_c}_{p_r}. \quad (15)$$

By averaging Equation (15) over a line period $T_{line}$ while combining Equations (8) and (9) yields:

$$\langle|v_{ac}|\rangle_{T_{line}} = \frac{\langle v_{dc}i_L\rangle_{T_{line}}}{\langle(1-d_B)i_L\rangle_{T_{line}}}, \quad (16)$$

where $\langle\cdot\rangle_{T_{line}}$ is an averaging operator over $T_{line}$. Equation (16) indicates that voltage conversion characteristics of inverter 1700 have a similar form to that of a boost converter. Further, based on Equations (14) and (16), the input dc voltage $v_{dc}$ should be lower than $V_{ac}/2$ provided that Equation (12) is satisfied.

Figure 20:
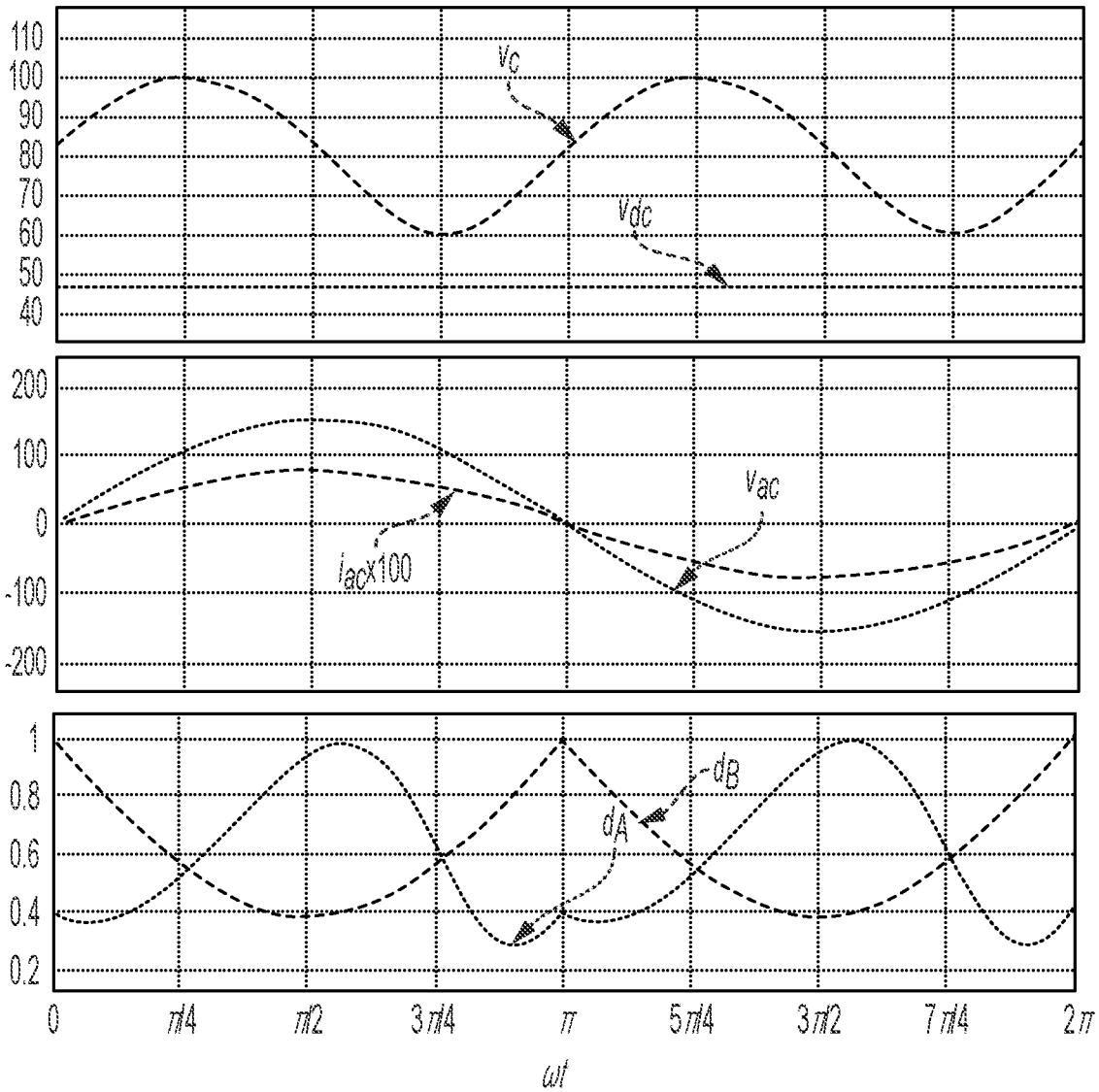
FIG. 20 depicts calculated waveforms of AC voltage $v_{ac}$ and current $i_{ac}$, DC voltage $v_{dc}$, buffer capacitor voltage $v_c$ and the duty cycles of switches $S_A$ and $S_B$: $d_A$ and $d_B$ in accordance with exemplary embodiments of the present application.

FIG. 20 illustrates $d_A$ and $d_B$ from the above analysis plotted versus $V_{ac}$, $i_{ac}$, $v_{dc}$ and $v_c$ over one line period $T_{line}$ based on Equations (1), (3), (4), (11), and the exemplary circuit specifications listed in Table IV.

TABLE IV

Circuit Specifications.

| Parameters | Values | Parameters | Values |
|---|---|---|---|
| Input dc voltage $V_{dc}$ | 48 V | Full output power | 60 W |
| Output ac RMS voltage | 110 V | Output ac frequency | 60 Hz |
| Flying capacitor $C_b$ | 50 μF | Main inductor L | 1 mH |
| ac capacitor $C_{ac}$ | 0.47 μF | Switching frequency $f_s$ | 75 kHz |
| $D_A$-$D_C$ | VT5202 | $S_A$-$S_C$, $S_1$-$S_4$ | STF20NF20 |

FIG. 20 shows that $d_A$ and $d_B$ are within a duty cycle 0-100%, indicating that required operating constraints are satisfied.

In view of the foregoing, it can be seen that exemplary embodiments of the application provide for: (1) relatively low voltage stress for both the first and second current switching networks, enabling switches with better figure-of-merits to be selected towards achieving higher efficiency and power density; (2) relatively low voltage rating for the floating (buffer) capacitor $C_b$, resulting in a smaller capacitor volume; and (3) a relatively low volume inductor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A power converter circuit, comprising:
a direct current (DC) source or load;
a first passive network;
a first current switching network;
at least one floating capacitor;
a second current switching network;
a second passive network; and
an alternating current (AC) source or load;
wherein the first passive network is connected between the DC source or load and the first current switching network for linking the DC source or load and the first current switching network,
wherein the first current switching network is configured to operate in a plurality of states, including a first state which provides an interface between the DC source or load and the second passive network via a circuit path bypassing the at least one floating capacitor;
wherein the first current switching network comprises at least four serially linked switches for switching the power converter circuit between switching cycles;
wherein the at least four serially linked switches comprise at least two diodes and at least two metal-oxide-semiconductor field-effect transistor (MOSFET) switches; and
wherein one or more of the at least two diodes is connected to a corresponding MOSFET switch of the at least two MOSFET switches in a back-to-back arrangement.

2. The power converter circuit according to claim 1, wherein the at least one floating capacitor is connected to the first current switching network.

3. The power converter circuit according to claim 2, wherein the second current switching network comprises two pairs of switches for providing an interface between the first current switching network and the second passive network; and
wherein the second passive network is connected between the second current switching network and the AC source or load.

4. The power converter circuit according to claim 3, wherein the first passive network comprises an inductor L.

5. The power converter circuit according to claim 3, wherein the second passive network comprises an inductor $L_f$ and a capacitor $C_f$.

6. The power converter circuit according to claim 3, wherein the power converter circuit is a unidirectional power converter; and
wherein the two pairs of switches comprise switches $S_1$, $S_2$, $S_3$ and $S_4$, wherein the switches $S_1$, $S_2$, $S_3$ and $S_4$ are diodes.

7. The power converter circuit according to claim 3, wherein the power converter circuit is a unidirectional power converter; and
wherein the two pairs of switches comprise switches $S_1$, $S_2$, $S_3$ and $S_4$, wherein at least three switches of the at least four serially linked switches are diodes.

8. The power converter circuit according to claim 3, wherein the power converter circuit is arranged as a rectifier; and
wherein the at least four serially linked switches comprise three MOSFET switches $S_A$, $S_B$, and $S_C$ and two diodes $D_A$ and $D_C$.

9. The power converter circuit according to claim 3, wherein the power converter circuit is arranged as an inverter; and
wherein the at least four serially linked switches comprise two MOSFET switches $S_A$ and $S_B$ and three diodes $D_A$, $D_B$ and $D_C$.

10. The power converter circuit according to claim 3, wherein the power converter circuit is arranged as an inverter; and
wherein the at least four serially linked switches comprise three MOSFET switches $S_A$, $S_B$, and $S_C$ and three diodes $D_A$, $D_B$ and $D_C$.

11. A method for operating a power converter circuit, comprising:
during a first interval, providing, by a first passive network, an interface between a direct current (DC) source or load and a rectified converter-side voltage of a second passive network via a circuit path bypassing at least one floating capacitor;

during a second interval, connecting, by the first passive network, solely to the DC source or load;

during a third interval, providing, by the first passive network, an interface between the at least one floating capacitor and the DC source or load; and during a fourth interval, providing, by the first passive network, an interface between the at least one floating capacitor, the DC source or load, and the rectified converter-side voltage of the second passive network;

wherein the power converter circuit comprises a first current switching network providing an interface between the DC source or load and the rectified converter-side voltage of the second passive network, wherein the first current switching network comprises at least four serially linked switches for switching the power converter circuit between switching cycles, and wherein the at least four serially linked switches comprise at least two diodes and at least two metal-oxide-semiconductor field-effect transistor (MOSFET) switches, and wherein one or more of the at least two diodes is connected to a corresponding MOSFET switch of the at least two MOSFET switches in a back-to-back arrangement.

12. The method of claim 11, wherein the power converter circuit comprises:

a second current switching network capable of providing an interface between the first current switching network and the second passive network.

13. The power converter circuit according to claim 12, wherein the second current switching network comprises two pairs of switches; and wherein the first current switching network and the second current switching network are configured for switching the power converter circuit between the first interval, the second interval, the third interval, and the fourth interval.

14. A power converter circuit, comprising:

a direct current (DC) source or load;

a first passive network;

a first current switching network;

at least one floating capacitor;

a second current switching network;

a second passive network; and an alternating current (AC) source or load;

wherein the first passive network is connected between the DC source or load and the first current switching network for linking the DC source or load and the first current switching network;

wherein the first current switching network comprises at least four serially linked switches for switching the power converter circuit between switching cycles;

wherein the at least one floating capacitor is connected to the first current switching network;

wherein the second current switching network comprises two pairs of switches for providing an interface between the first current switching network and the second passive network;

wherein the second passive network is connected between the second current switching network and the AC source or load;

wherein the first current switching network is configured to operate in a plurality of states, including a first state which provides an interface between the DC source or load and the second passive network via a circuit path bypassing the at least one floating capacitor; and wherein the at least four serially linked switches comprise at least two diodes and at least two metal-oxide-semiconductor field-effect transistor (MOSFET) switches;

wherein one or more of the at least two diodes is connected to a corresponding MOSFET switch of the at least two MOSFET switches in a back-to-back arrangement.

15. The power converter circuit according to claim 14, wherein the power converter circuit is arranged as a rectifier; and wherein the at least four serially linked switches comprise three MOSFET switches $S_A$, $S_B$, and $S_C$ and two diodes $D_A$ and $D_C$.

16. The power converter circuit according to claim 14, wherein the power converter circuit is arranged as an inverter; and wherein the at least four serially linked switches comprise two MOSFET switches $S_A$ and $S_B$ and three diodes $D_A$, $D_B$ and $D_C$.

17. The power converter circuit according to claim 14, wherein the power converter circuit is arranged as an inverter; and wherein the at least four serially linked switches comprise three MOSFET switches $S_A$, $S_B$, and $S_C$ and three diodes $D_A$, $D_B$ and $D_C$.

\* \* \* \* \*